US012718993B2

(12) United States Patent
Doro et al.

(10) Patent No.: US 12,718,993 B2
(45) Date of Patent: Aug. 25, 2026

(54) ELECTRONIC COMPONENT

(71) Applicant: Panasonic Intellectual Property Management Co., Ltd., Osaka (JP)

(72) Inventors: Kunio Doro, Okayama (JP); Tatsuya Ando, Gifu (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 250 days.

(21) Appl. No.: 18/490,928

(22) Filed: Oct. 20, 2023

(65) Prior Publication Data

US 2024/0047154 A1 Feb. 8, 2024

Related U.S. Application Data

(63) Continuation-in-part of application No. PCT/JP2022/015980, filed on Mar. 30, 2022.

(30) Foreign Application Priority Data

Apr. 28, 2021 (JP) ................................ 2021-076565
Feb. 18, 2022 (JP) ................................ 2022-024237

(51) Int. Cl.

| | |
|---|---|
| ***H01H 13/04*** | (2006.01) |
| ***H01H 11/00*** | (2006.01) |
| *H01H 13/10* | (2006.01) |
| *H01H 13/14* | (2006.01) |

(52) U.S. Cl.

CPC ............ *H01H 13/04* (2013.01); *H01H 11/00* (2013.01); *H01H 13/10* (2013.01); *H01H 13/14* (2013.01)

(58) Field of Classification Search

CPC ........ H01H 13/04; H01H 11/00; H01H 13/10; H01H 13/14; H01H 1/58; H01H 2001/5888; H01H 2229/04

See application file for complete search history.

(56) References Cited

U.S. PATENT DOCUMENTS

| | | | | |
|---|---|---|---|---|
| 8,124,902 B2 * | 2/2012 | Watanabe | ............. | H01H 13/20 200/534 |
| 8,143,991 B2 * | 3/2012 | Yang | ................... | H01H 37/761 337/186 |
| 2008/0035462 A1 | 2/2008 | Yanai et al. | | |

FOREIGN PATENT DOCUMENTS

| | | |
|---|---|---|
| JP | 09-069680 A | 3/1997 |
| JP | 2008-041603 A | 2/2008 |
| JP | 2013-080591 A | 5/2013 |
| JP | 7038334 B2 | 3/2022 |

OTHER PUBLICATIONS

International Search Report issued on Jun. 7, 2022 in International Patent Application No. PCT/JP2022/015980, with English translation.

* cited by examiner

*Primary Examiner* — Lheiren Mae A Caroc
(74) *Attorney, Agent, or Firm* — RIMON P.C.

(57) ABSTRACT

An electronic component includes a terminal area and a solder member provided on the terminal area. The solder member includes a joint site that is joined to the terminal area, and a non-joint site that is not joined to the terminal area, and has a first surface that faces the terminal area and a second surface that is located on a side opposite to the first surface. The joint site is joined to the terminal area in the first surface, and the non-joint site is not joined to the terminal area in the first surface.

25 Claims, 32 Drawing Sheets

ELECTRONIC COMPONENT

CROSS REFERENCE TO RELATED APPLICATIONS

This is a continuation-in-part application of PCT International Application No. PCT/JP2022/015980 filed on Mar. 30, 2022, designating the United States of America, which is based on and claims priority of Japanese Patent Application No. 2021-076565 filed on Apr. 28, 2021, and Japanese Patent Application No. 2022-024237 filed on Feb. 18, 2022. The entire disclosures of the above-identified applications, including the specifications, drawings and claims are incorporated herein by reference in their entirety.

FIELD

The present disclosure relates to an electronic component used in electronic equipment.

BACKGROUND

For example, an electronic component such as a switch is mounted by soldering on a circuit board or any other device. As one example of the electronic component of this kind, Patent Literature (PTL) 1 discloses an electronic component having an external terminal provided with reserve solder. This electronic component alleviates a shortage of the amount of solder when the external terminal is joined to a circuit board.

CITATION LIST

Patent Literature

PTL 1: Japanese Unexamined Patent Application Publication No. H9-69680

SUMMARY

Technical Problem

The electronic component described in PTL 1, however, melts the whole of a solder material when providing the external terminal with the reserve solder. Melting the whole of the solder material may change the quality of the solder material as a whole and result in a decrease in reliability of connection at the time of mounting.

In view of the above, it is an object of the present disclosure to provide an electronic component that suppresses a decrease in reliability of connection at the time of mounting.

Solution to Problem

An electronic component according to one aspect of the present disclosure includes a terminal area and a solder member provided on the terminal area. The solder member includes a joint site that is joined to the terminal area, and a non-joint site that is not joined to the terminal area.

Advantageous Effects

The electronic component according to the present disclosure is capable of suppressing a decrease in reliability of connection at the time of mounting. Note that a switch, a cable component, and a cable-equipped connector described below are examples of the electronic component.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS (Circumstances Leading to the Present Disclosure)

A switch used in electronic equipment is mounted on a circuit board or any other device by using a solder material. In these days, reconstruction of supply chains is developed in accordance with business continuity plans (BCPs), and in the field of switches, reconstruction of supply chains including a solder material is also being considered.

As one example of an electronic component that is mounted on a circuit board or any other device, an electronic component having an external terminal provided with reserve solder is known. This electronic component supplements the amount of solder that becomes necessary when joining the external terminal to the circuit board. However, this electronic component needs to melt the solder material by applying large amounts of heat to the whole of the solder material when providing the external terminal with the reserve solder. Melting the whole of the solder material may change the quality of the solidified solder material as a whole and result in a decrease in reliability of connection at the time of mounting.

In contrast to this, a switch according to the present disclosure has a configuration described below in order to suppress a decrease in reliability of connection at the time of mounting.

Hereinafter, embodiments will be described in detail with reference to the drawings.

Note that each embodiment described below shows one specific example of the present disclosure. Numerical values, shapes, materials, constituent elements, layout positions of the constituent elements, forms of connection, steps, a sequence of steps, and so on shown in the following embodiments are mere examples and do not intend to limit the present disclosure. Among the constituent elements in the following embodiments, those that are not recited in any of the independent claims are described as optional constituent elements.

In each drawing, X, Y, and Z axes that mean three directions orthogonal to one another are shown and used as necessary for description. Each axis is provided merely for description and does not intend to limit the direction and position of the switch.

Embodiment 1

(Switch Configuration)

A switch according to Embodiment 1 will be described with reference to FIGS. 1 to FIGS. 7A and 7B.

Figure 1:
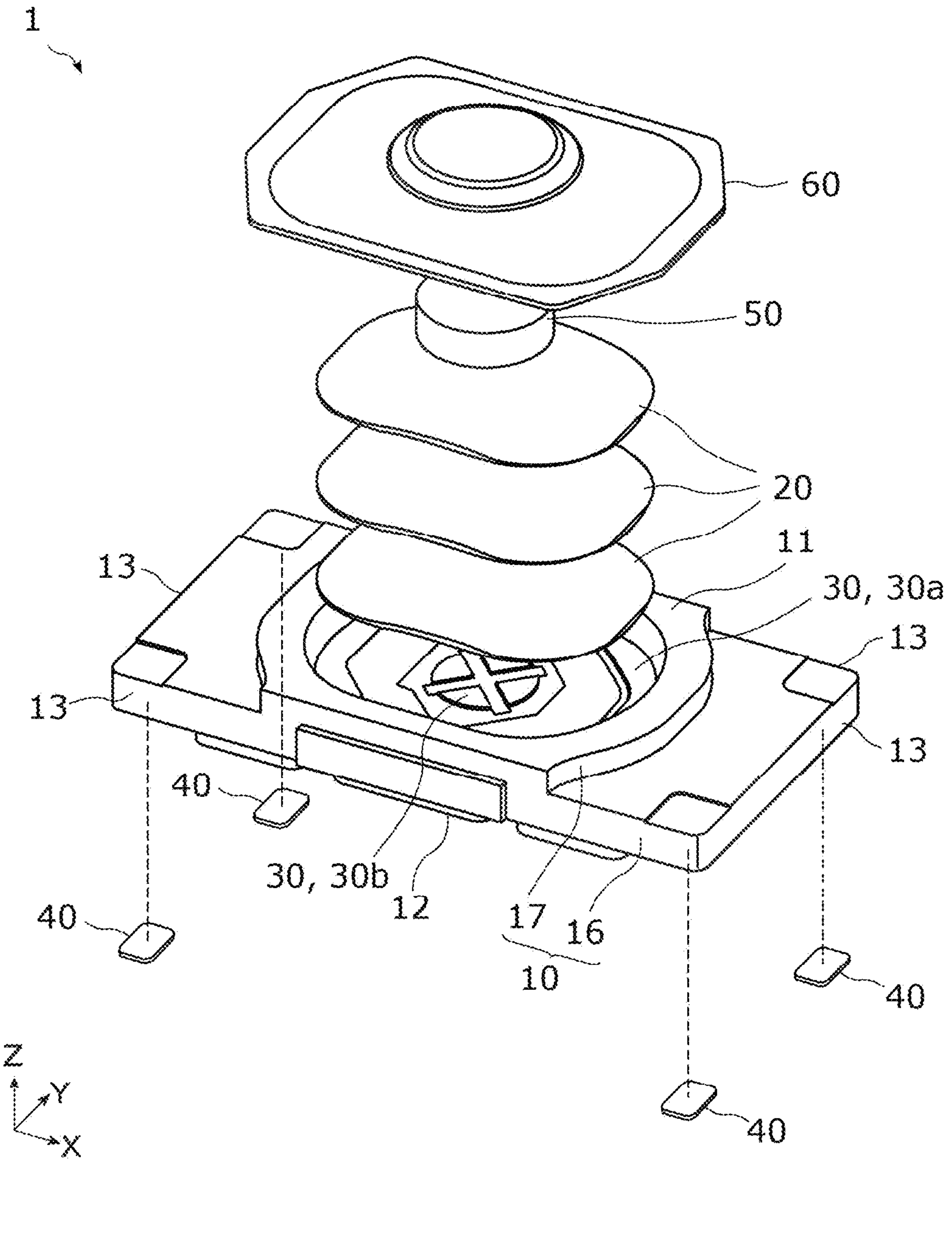
FIG. 1 is an exploded perspective view of a switch according to Embodiment 1.
Figure 2A:
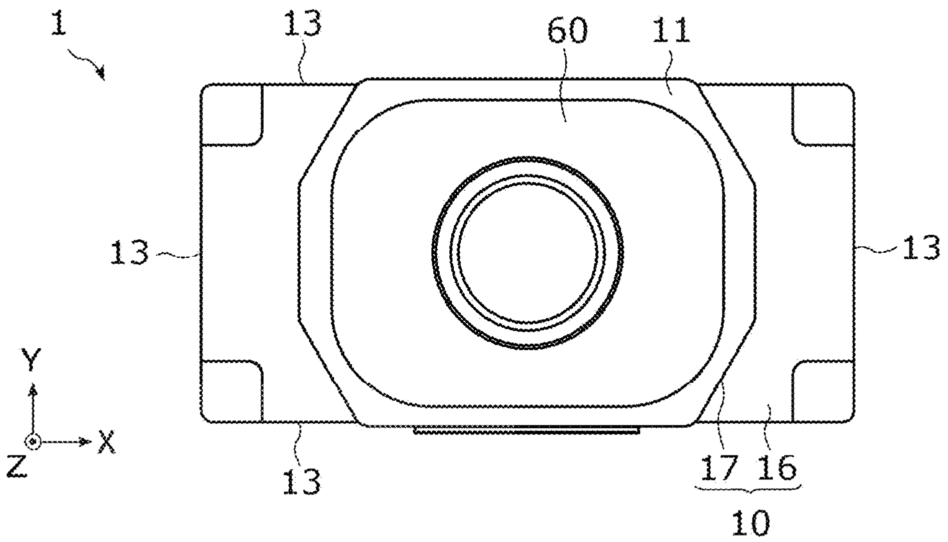
FIG. 2A is a top panel view of the switch according to Embodiment 1.
Figure 2B:
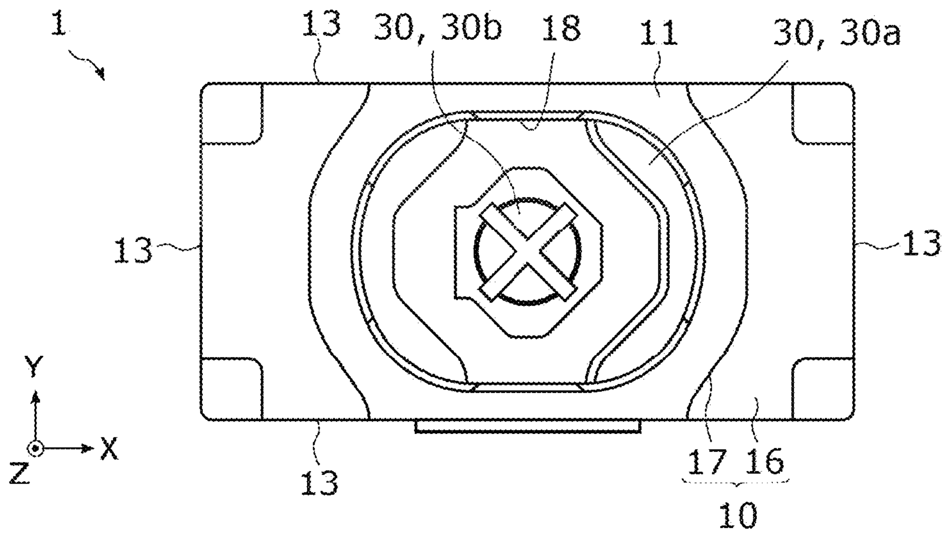
FIG. 2B is another top panel view of the switch according to Embodiment 1.
Figure 3:
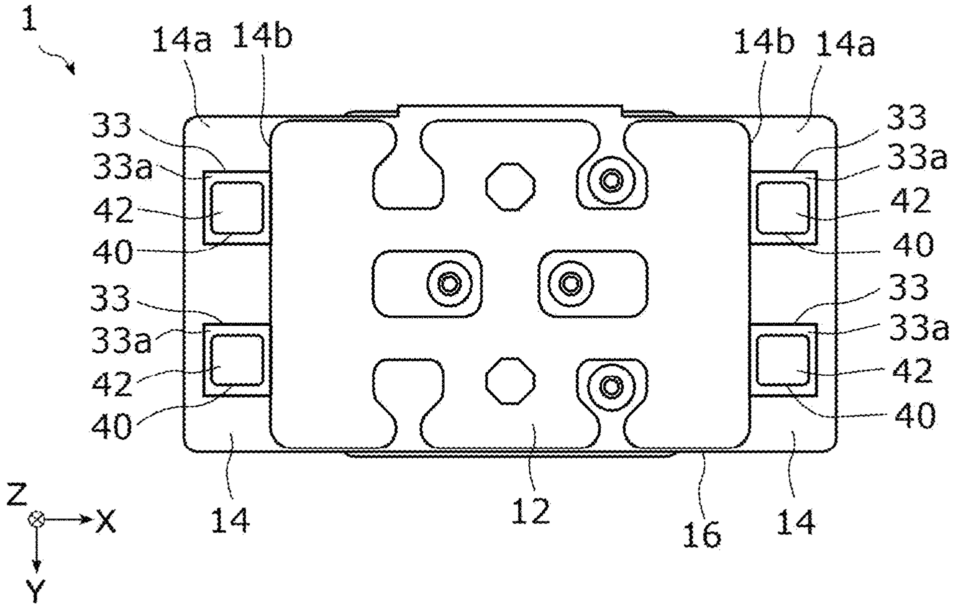
FIG. 3 is a bottom view of the switch according to Embodiment 1.
Figure 4:
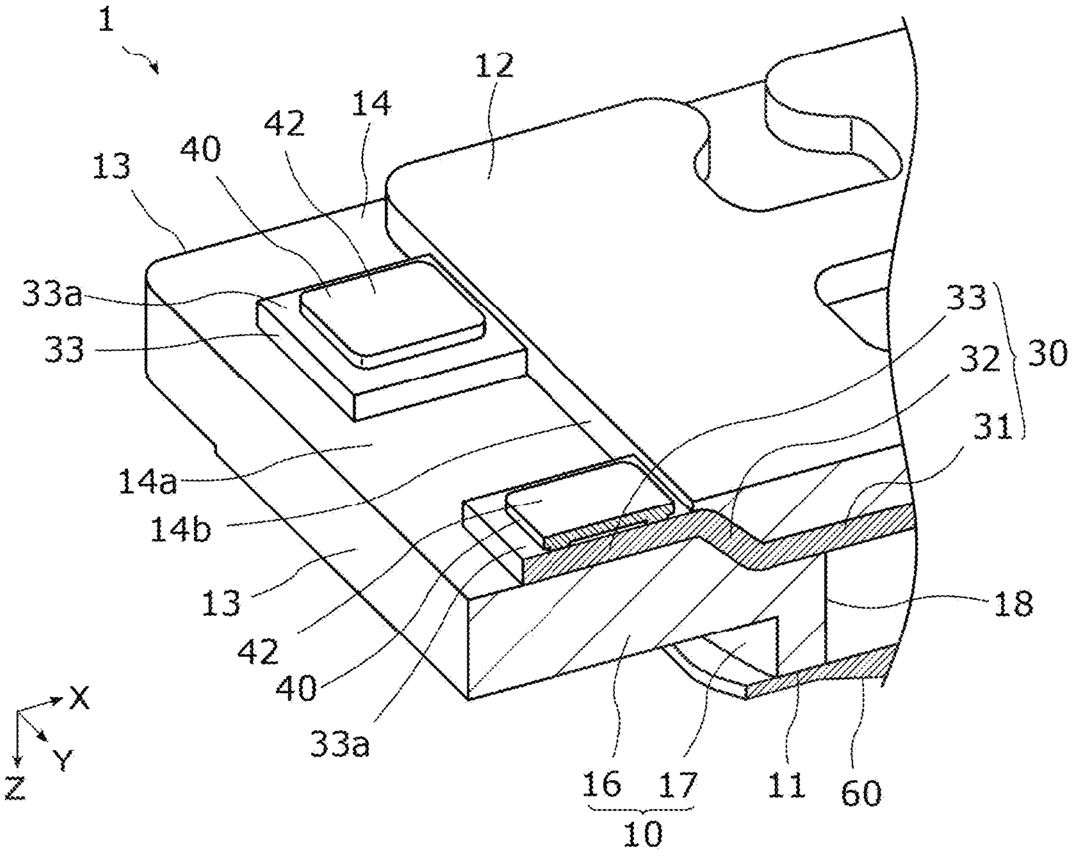
FIG. 4 is a sectional perspective view of part of the switch according to Embodiment 1 as viewed in an oblique direction from the bottom surface side.

FIG. 1 is an exploded perspective view of switch 1 according to Embodiment 1. FIGS. 2A and 2B are top panel views of switch 1. FIG. 3 is a bottom view of switch 1. FIG. 4 is sectional perspective view of part of switch 1 as viewed in an oblique direction from the side of bottom surface 12.

Figure 2C:
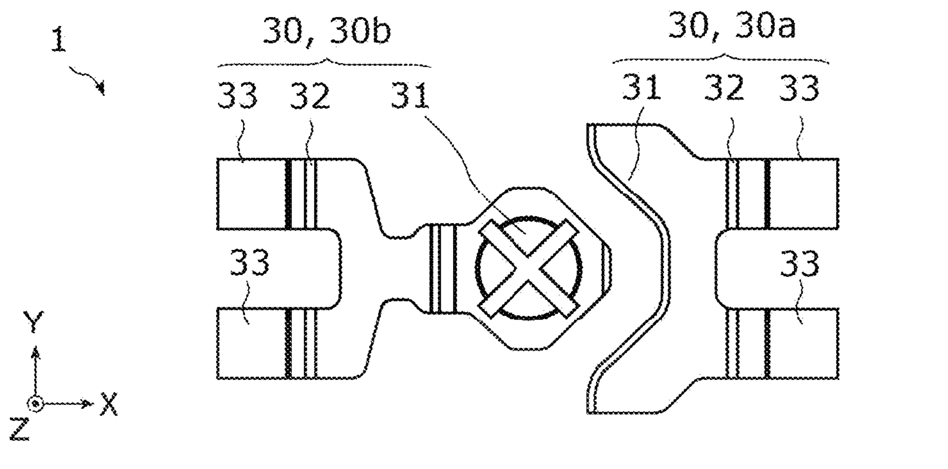
FIG. 2C is another top panel view of the switch according to Embodiment 1.

FIG. 1 shows a state in which case 10, first fixed contact member 30*a*, and second fixed contact member 30*b* are integrated with one another. FIG. 2A is a diagram showing switch 1 as viewed from top panel 11. FIG. 2B shows a state in which sheet protector 60, pressure member 50, and movable contact member 20 are removed from FIG. 2A. FIG. 2C is a diagram showing first fixed contact member 30*a* and second fixed contact member 30*b* and shows a state in which case 10 is removed from FIG. 2B. In FIG. 4, movable contact member 20 is not shown.

As shown in FIGS. 1 and 2A to 2C, switch 1 includes case 10, movable contact member 20, first and second fixed contact members 30*a* and 30*b*, sheet protector 60, and pressure member 50. As shown in FIGS. 1 and 3, switch 1 further includes solder member 40.

Case 10 is a member serving as a base of switch 1 and may include, for example, a resin material having insulating properties. Case 10 includes rectangular parallelepiped case body 16 and ring-shaped protrusion 17.

Case 10 has top panel 11, bottom surface 12, and a plurality of side faces 13. Top panel 11 is located at the protruding end face of protrusion 17. Bottom surface 12 is located at the end face of case body 16 on the side opposite to the surface on which protrusion 17 is provided. Side faces 13 are located at the lateral end faces of case body 16.

As shown in FIGS. 3 and 4, case 10 has a plurality of dent portions 14 that are recessed from bottom surface 12 toward top panel 11. Each dent portion 14 has dent bottom surface 14*a* that is parallel to bottom surface 12, and dent side faces 14*b* that are parallel to side faces 13.

As shown in FIG. 1, protrusion 17 protrudes from the surface of case body 16 that is on the side opposite to bottom surface 12. The protruding end face of protrusion 17 has an opening. That is, case 10 includes recessed portion 18 that is recessed from the protruding end face of protrusion 17 toward bottom surface 12.

Movable contact member 20 is disposed in recessed portion 18 of case 10. Movable contact member 20 has a domed curved shape and may be formed by, for example, a plurality of thin metal plates each having elasticity. On the bottom surface of movable contact member 20, a metallic material layer having high conductivity may be formed. Although FIG. 1 shows an example in which movable contact member 20 is configured by three layers of thin metal plates, movable contact member 20 may be configured by a single layer of thin metal plate.

Movable contact member 20 is a member for bringing first and second fixed contact members 30*a* and 30*b* into an electrically connected state or an electrically non-connected state. For example, the outer edge of movable contact member 20 is in conducting contact with first fixed contact member 30*a*, and when movable contact member 20 is pressed toward bottom surface 12, the central portion of movable contact member 20 comes in conducting contact with second fixed contact member 30*b*. When movable contact member 20 is not pressed, the central portion and second fixed contact member 30*b* are not in contact with each other, and a space is formed between the central portion and second fixed contact member 30*b*.

Sheet protector 60 is provided on protrusion 17 of case 10 so as to cover movable contact member 20. For example, sheet protector 60 may include an insulating film having flexibility. Pressure member 50 is disposed in the central portion of movable contact member 20 and sandwiched between movable contact member 20 and sheet protector 60. For example, pressure member 50 may include a resin material having insulating properties.

First fixed contact member 30*a* shown in FIGS. 2B and 2C is a member that comes in conducting contact with the outer edge of movable contact member 20. Second fixed contact member 30*b* is a member that comes in conducting contact with the central portion of movable contact member 20. For example, first and second fixed contact members 30*a* and 30*b* may include a metal material and subjected to insert molding together with case 10. In the following description, both or either of first and second fixed contact members 30*a* and 30*b* may also be referred to as fixed contact member(s) 30.

As shown in FIG. 4, each fixed contact member 30 includes contact portion 31, buried portion 32, and a plurality of terminal areas 33. Contact portion 31, buried portion 32, and terminal areas 33 are configured of a single metal material and electrically connected to one another.

Contact portion 31 is exposed to recessed portion 18 of case 10 so as to be capable of having contact with movable contact member 20. Buried portion 32 is buried in case 10.

Each of terminal areas 33 is exposed to a region where dent portion 14 of case 10 is provided. Specifically, terminal area 33 protrudes laterally from dent side face 14*b* and is exposed out of case while being in contact with dent bottom surface 14*a*. Terminal area 33 has a thickness whose dimension is smaller than the depth of dent bottom surface 14*a*, and the bottom surface of terminal area 33, i.e., terminal bottom surface 33*a*, is located on the side closer to top panel 11 than bottom surface 12 (i.e., on the side of dent bottom surface 14*a*). Terminal bottom surface 33*a* is a surface that faces solder member 40 and on which a metallic deposit such as Ni plating and Au plating is formed.

Switch 1 according to the present embodiment has a structure in which solder member 40 is secured to terminal areas 33 described above.

Figure 5:
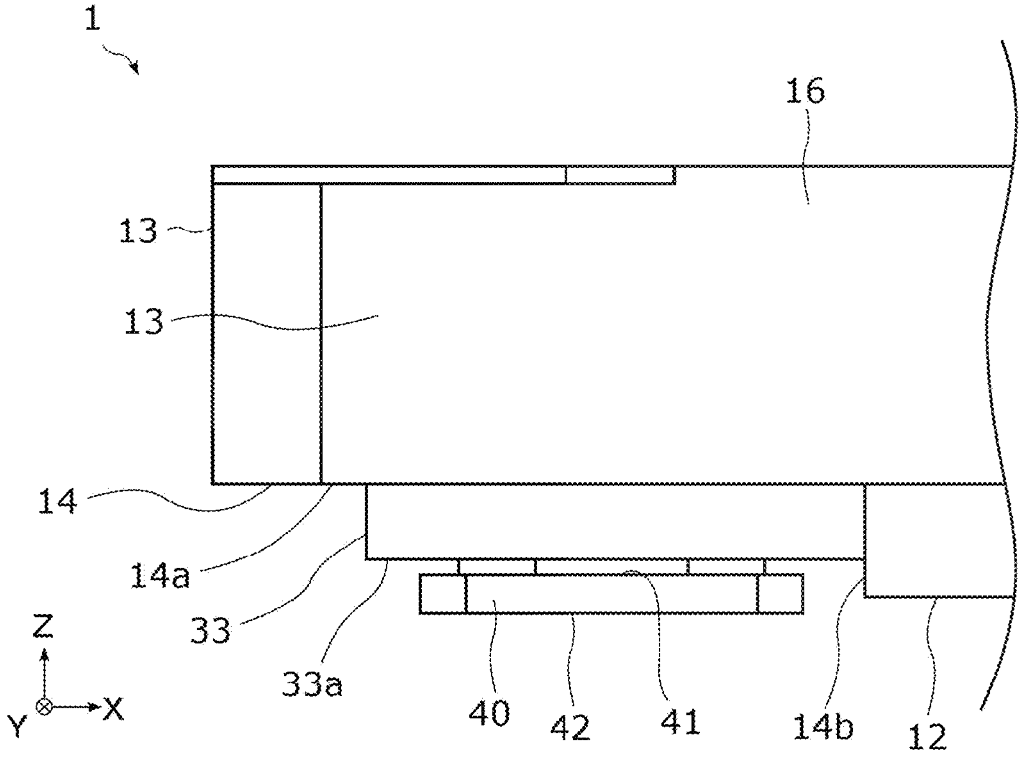
FIG. 5 is an enlarged view of part of the switch according to Embodiment 1 as viewed laterally.
Figure 6A:
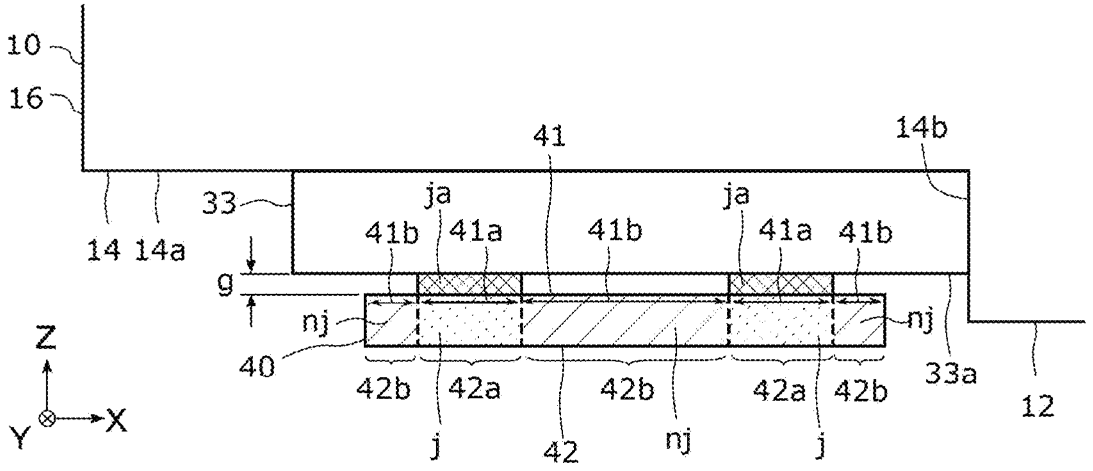
FIG. 6A is an enlarged view of a solder member of the switch according to Embodiment 1.
Figure 6B:
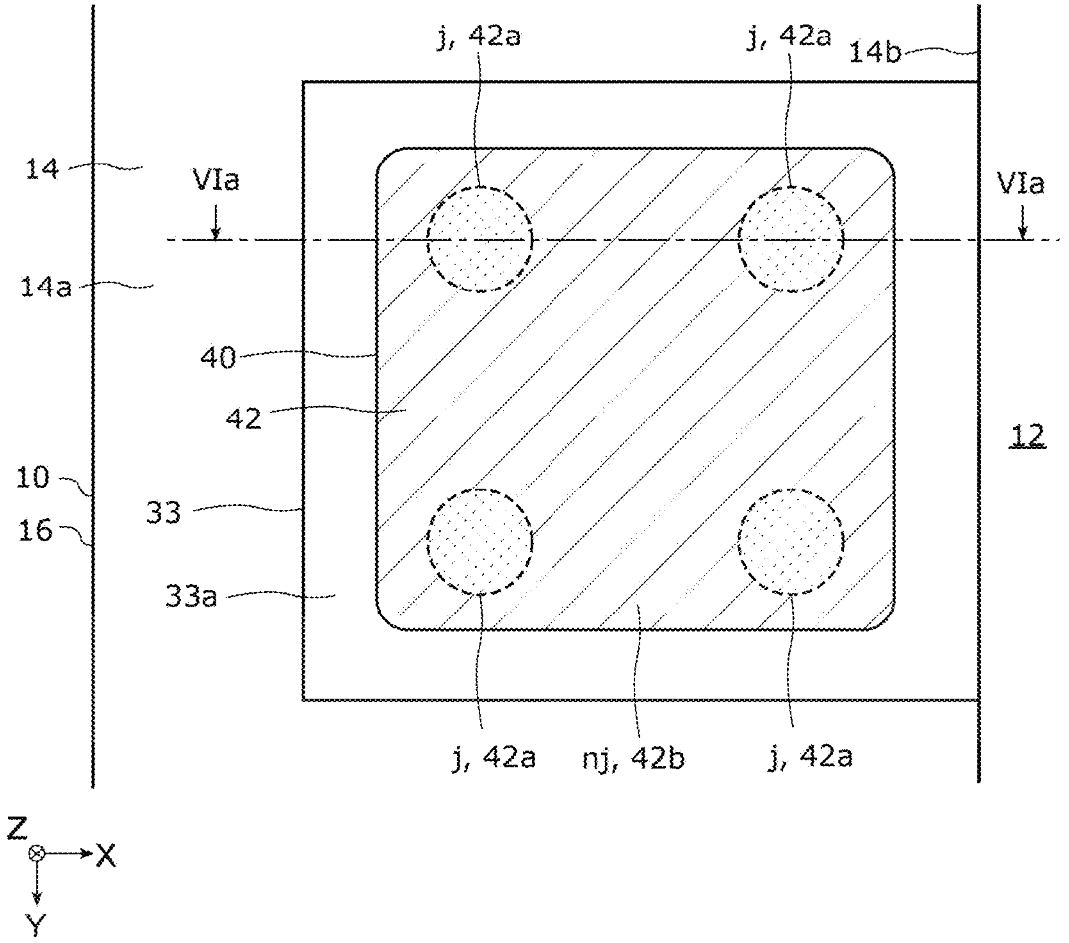
FIG. 6B is another enlarged view of the solder member of the switch according to Embodiment 1.

FIG. 5 is an enlarged view of part of switch 1 as viewed from one side. FIGS. 6A and 6B are enlarged views of solder member 40 of switch 1.

In FIGS. 6A and 6B, only solder member 40 is hatched. FIG. 6B is a diagram showing solder member 40 as viewed from the side of bottom surface 12. FIG. 6A shows a sectional view as viewed from line VIa-VIa in FIG. 6B. In FIG. 6A, first region 41*a* and second region 41*b*, which will be described later, are shown in ranges indicated by arrows and are also shown in ranges indicated by braces.

As shown in FIGS. 5, 6A, and 6B, solder member 40 is provided on terminal area 33 of fixed contact member 30. Solder member 40 is a plate- or sheet-like member with a predetermined thickness. The thickness of solder member 40 may, for example, be greater than or equal to 0.05 mm and less than or equal to 0.1 mm. In the case where a large number of solder members 40 are provided in a narrow region, solder members 40 may have a thickness of, for example, greater than or equal to 0.5 mm and less than or equal to 1 mm. When viewed from the side of bottom surface 12, solder member 40 has a rectangular shape.

Solder member 40 include a material such as Sn, Ag, and Cu. Note that a different material may also be added to solder member 40.

As shown in FIG. 6A, solder member 40 is soldered in part to terminal area 33. That is, solder member 40 includes joint sites j that are joined to terminal area 33 and non-joint site nj that is not joined to terminal area 33. In FIG. 6B, four circular joint sites j are indicated by hatched dots, and non-joint site nj is hatched. Although FIGS. 6A and 6B show an example in which solder member 40 includes a plurality of joint sites j, the number of joint sites j is not limited to a plural number and may be one. For example, joint sites j may be formed by laser machining.

As shown in FIG. 6B, solder member 40 has a smaller area than terminal area 33. Moreover, solder member 40 is arranged so as not extend outward off terminal area 33, i.e., arranged such that the side faces of solder member 40 are located inward of the side faces of terminal area 33.

The area of non-joint site nj of solder member 40 is larger than the area of joint sites j. In other words, the area of joint sites j is smaller than the area of non-joint site nj. For example, a total area of joint sites j may be larger than or equal to 0.05 times and smaller than or equal to 0.5 times of the area of non-joint site nj.

As shown in FIG. 6A, each joint site j includes alloy layer ja that is in contact with terminal area 33. In FIG. 6A, alloy layer ja is cross-hatched. Alloy layer ja includes a metal material for solder member 40 and a metal material for terminal area 33. For example, in the case where solder member 40 contains Sn and the surface of terminal area 33 is configured by Au plating, alloy layer ja contains an AuSn alloy. Note that regions of joint sites j other than alloy layer ja are regions that do not contain an AuSn alloy. The thickness of alloy layer ja is smaller enough than the thickness of the regions that do not contain an AuSn alloy and may, for example, be greater than or equal to 10 μm and less than or equal to 100 μm.

Solder member 40 has first surface 41 that faces terminal area 33, and second surface 42 that is located on the side opposite to first surface 41. Solder member 40 is arranged, with first surface 41 located on the side closer to top panel 11 of case 10 than bottom surface 12 and second surface 42 located to protrude out of bottom surface 12 of case 10. That is, part of solder member 40 protrudes outward of bottom surface 12 of case 10.

In first surface 41, region 41*a* that is included in joint sites j is joined to terminal area 33, and region 41*b* that is included in non-joint site nj is not joined to terminal area 33. There is gap g between terminal area 33 and region 41*b* included in non-joint site nj. Gap g may have a dimension of, for example, greater than or equal to 1 μm and less than or equal to 100 μm. Note that gap g is not necessarily formed along the whole region 41*b* and may be formed along only part of region 41*b*. That is, part of non-joint site nj may be in contact with terminal area 33 as long as it is not joined to terminal area 33.

Second surface 42 includes first regions 42*a* that are included in joint sites j and second regions 42*b* that are included in non-joint site nj. There are a plurality of first regions 42*a* depending on the number of joint sites j. First regions 42*a* are regions that are irradiated with laser beams and that have joint marks formed thereon. Second regions 42*b* are regions that are not irradiated with laser beams and that have no joint marks formed thereon. Second regions 42*b* are flatter than first regions 42*a* and, for example, may have smaller surface roughness than first regions 42*a*.

Figure 7A:
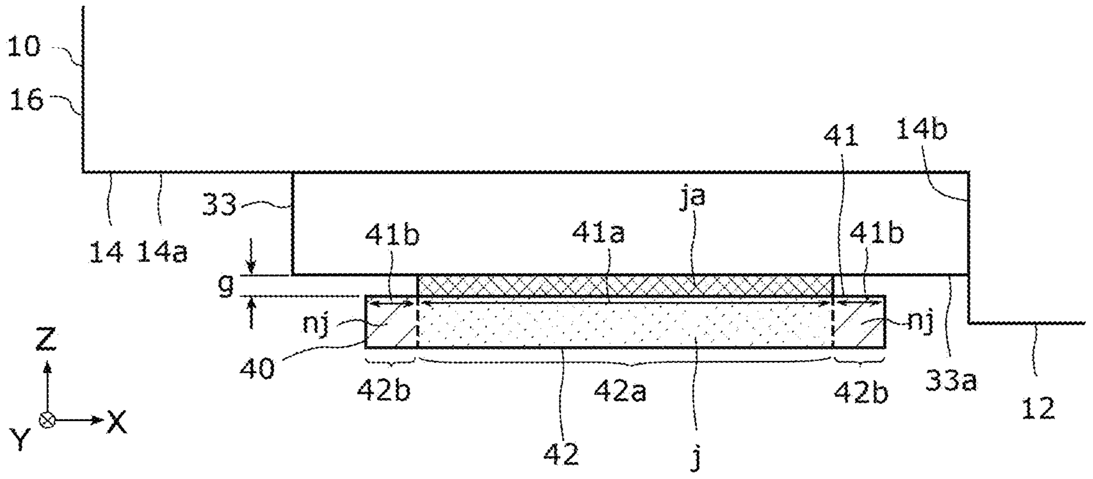
FIG. 7A is a diagram showing another example of the solder member.
Figure 7B:
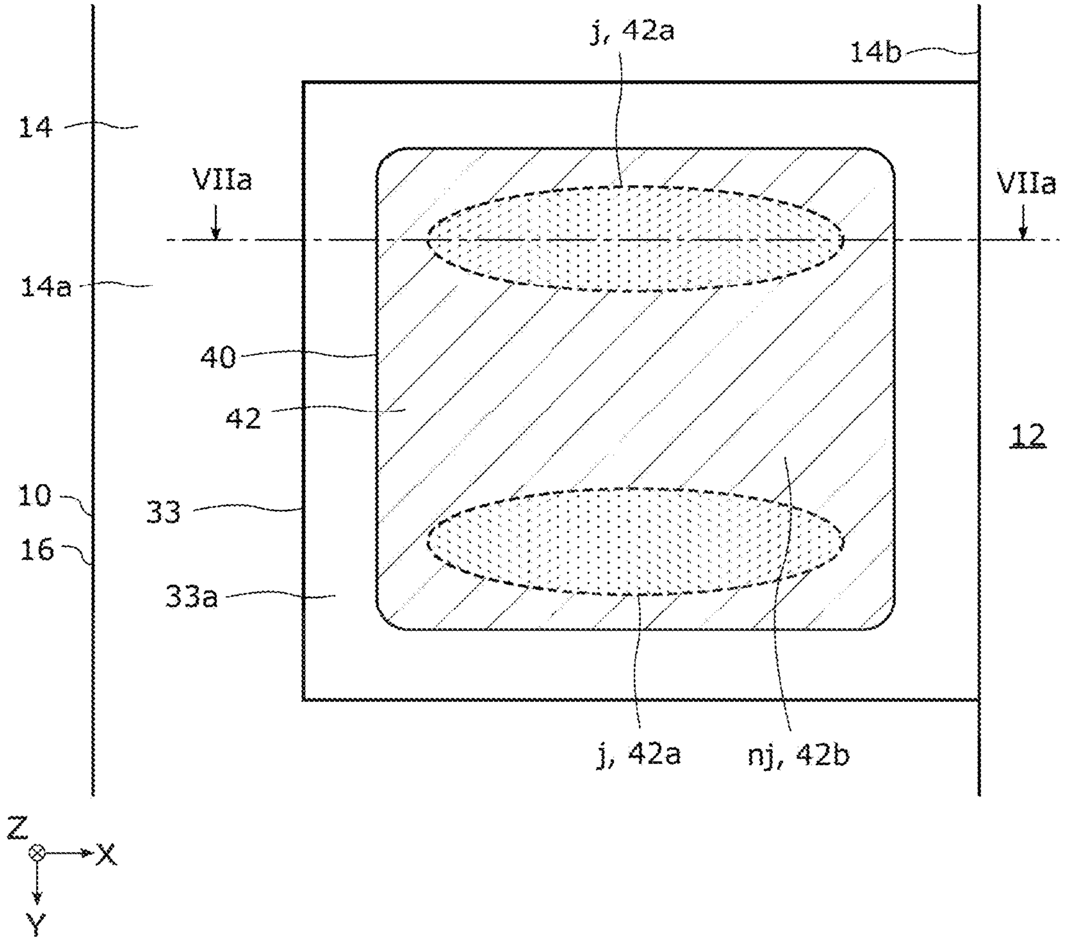
FIG. 7B is a diagram showing another example of the solder member.

FIG. 7A and FIG. 7B are each a diagram showing another example of solder member 40. In FIG. 7A and FIG. 7B, only solder member 40 is hatched. FIG. 7B is a diagram showing solder member 40 as viewed from the side of bottom surface 12. FIG. 7A is a sectional view as viewed from line VIIa-VIIa in FIG. 7B.

As shown in FIG. 7B, each of first regions 42*a* has an elliptical shape or a long hole-like shape. For example, when solder member 40 is viewed in a direction perpendicular to second surface 42, each of first regions 42*a* is provided along the short side of rectangular solder member 40. Part of each second region 42*b* is located between first regions 42*a*. In this case as well, it is desirable that the area of second regions 42*b* is larger than the area of first regions 42*a*.

In this way, in switch 1 according to the present embodiment, solder member 40 includes joint sites j that are joined to terminal areas 33 and non-joint site nj that is not joined to terminal areas 33. This configuration eliminates the need to melt the whole of the solder material when solder member 40 is provided on terminal areas 33 and only needs to melt part of the solder material. Thus, it is possible to reduce the likelihood that the solder material as a whole will suffer a change in quality. This suppresses a decrease in reliability of connection at the time of mounting.

(Method of Manufacturing Switch)

A method of manufacturing switch 1 having the configuration described above will be described with reference to FIGS. 8 and 9.

Figure 8:
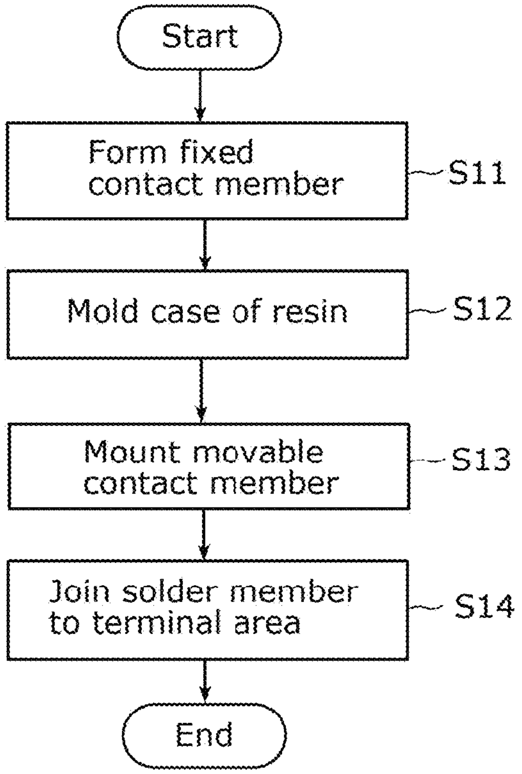
FIG. 8 is a flowchart showing a method of manufacturing a switch according to Embodiment 1.
Figure 9:
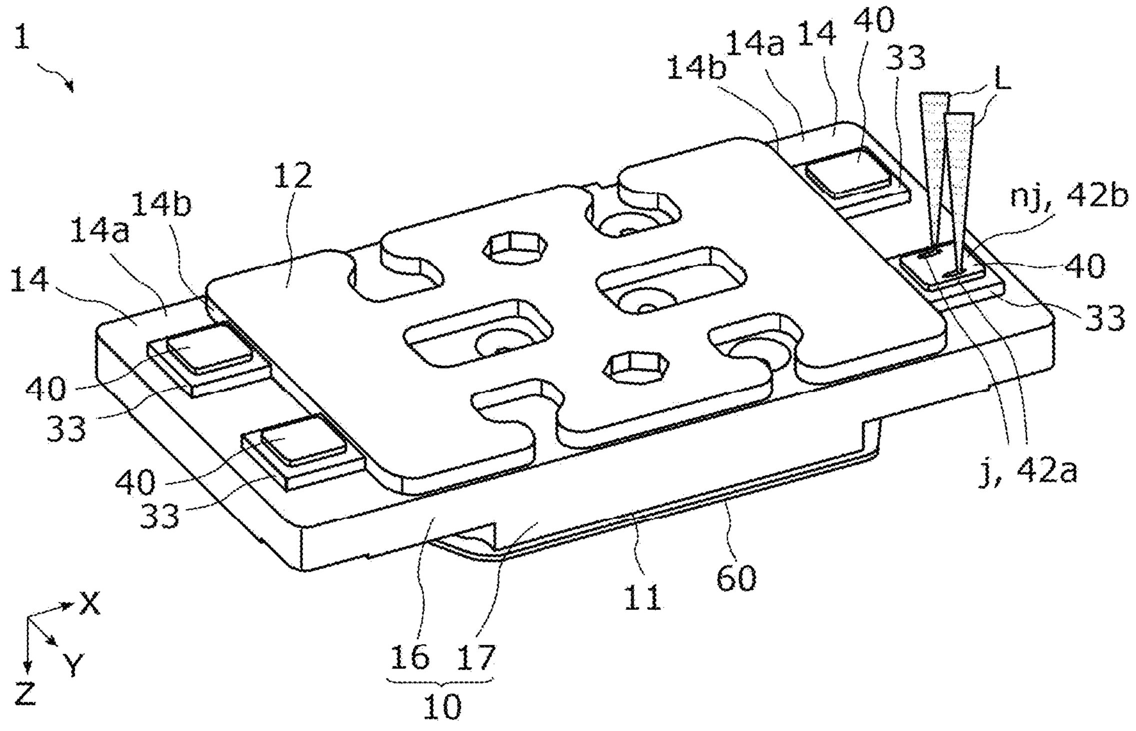
FIG. 9 is a diagram showing a step of joining the solder member.

FIG. 8 is a flowchart showing the method of manufacturing switch 1. FIG. 9 is a diagram showing a step of joining solder member 40.

As shown in FIG. 8, the method of manufacturing switch 1 includes step S11 of forming fixed contact member 30, step S12 of molding case 10 of a resin, step S13 of attaching movable contact member 20, and step S14 of joining solder member 40.

In step S11, fixed contact member 30 is formed by subjecting a metal plate to blanking and holding. Before blanking and holding, the front and back surfaces of the metal plate may be subjected to metal plating. Moreover, the front surface of portions of fixed contact member 30 that form terminal areas 33, i.e., the surface that comes in contact with dent bottom surfaces 14*a* of case 10, may be subjected to blasting.

In step S12, case 10 is molded of a resin. Specifically, insert molding is conducted such that, after fixed contact member 30 is inserted in a die, the die is filled with a resin. In this way, an intermediate product is formed that includes case 10 and fixed contact member 30 that includes contact portion 31, buried portion 32, and terminal areas 33.

In step S13, movable contact member 20 is attached to the intermediate product described above. Specifically, movable contact member 20 and pressure member 50 are inserted in recessed portion 18 of case 10, and sheet protector 60 is provided on protrusion 17 so as to cover movable contact member 20 and pressure member 50. Sheet protector 60 is bonded to top panel 11 of case 10 with an adhesive.

In step S14, solder member 40 is joined to terminal areas 33. For example, as shown in FIG. 9, solder member 40 that is a rolled stock is disposed on terminal areas 33, with bottom surface 12 of case 10 facing upward and top panel 11 facing downward. Then, with solder member 40 abutting on terminal areas 33, laser beams L are applied to regions that correspond to parts of solder member 40 so as to join solder member 40 with solder to terminal areas 33. For example, this solder bonding is instantaneously achieved by infrared laser. Thus, solder member 40 includes joint sites j that are molten and joined to terminal areas 33, and non-joint site nj that is neither molten nor joined to terminal areas 33. For example, joint sites j may be formed by scanning with laser beams L. Solder member 40 includes a plurality of joint sites j.

Note that joint sites j may be formed by irradiating a plurality of regions simultaneously with laser beams L, or may be formed by irradiating a plurality of regions individually at different times with laser beams L. While FIG. 9 shows an example in which scanning with laser beams L is conducted in the X direction, scanning with laser beams L may be conducted in the Y direction. Step S14 may be executed before step S13 as long as it is performed after step S12.

Through steps S11 to S14 described above, switch 1 having the aforementioned configuration is produced. Thus, it is possible to provide switch 1 that includes tentatively attached solder member 40. For example, although conventional technology requires solder cream to be formed in advance on a circuit board in order to mount switch 1 on the circuit board, switch 1 according to the present embodiment can be mounted on the circuit board without any solder cream or with only a reduced amount of solder cream.

Next, an example of joining solder member 40 to terminal areas 33 of switch 1 will be described.

Figure 10:
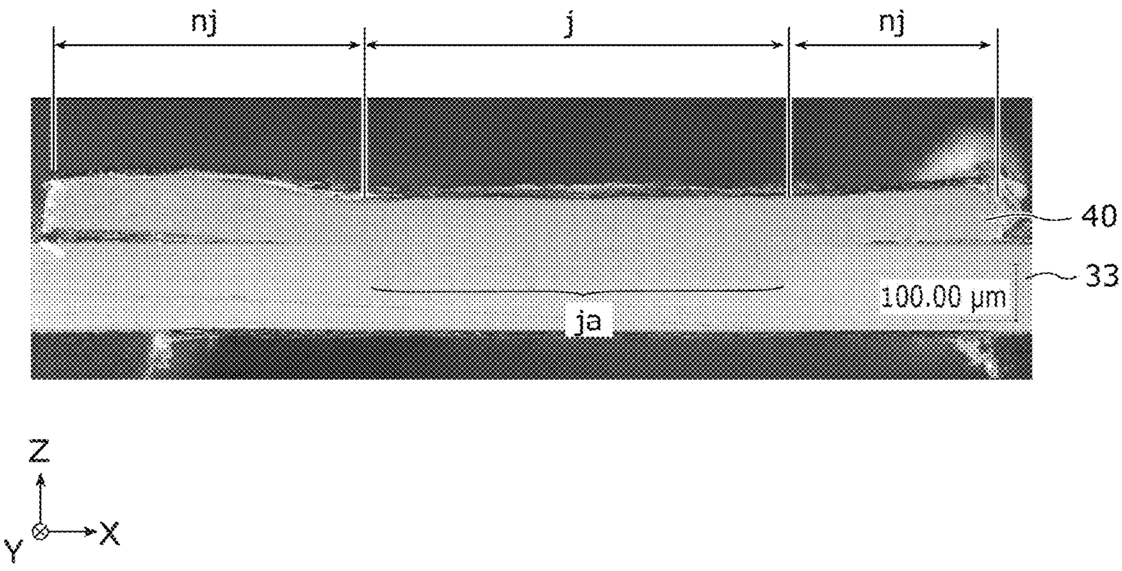
FIG. 10 represents a sectional image showing an example of joining the solder member to a terminal area of the switch.

FIG. 10 represents a sectional image showing an example of joining solder member 40 to terminal area 33 of switch 1. FIG. 10 represents a sectional image when, with solder member 40 placed on terminal area 33 of switch 1, solder member 40 is joined to terminal area 33 by irradiation with laser beams L while scanning is conducted in the horizontal direction. In this example, an image is captured of a section of the switch that has interstices between terminal area 33 and dent bottom surface 14*a* of case 10. As shown in the drawing, solder member 40 include joint site j that is molten and joined to terminal area 33, and non-joint site nj that is neither molten nor joined to terminal area 33. Joint site j includes alloy layer ja formed thereon.

Figure 11:
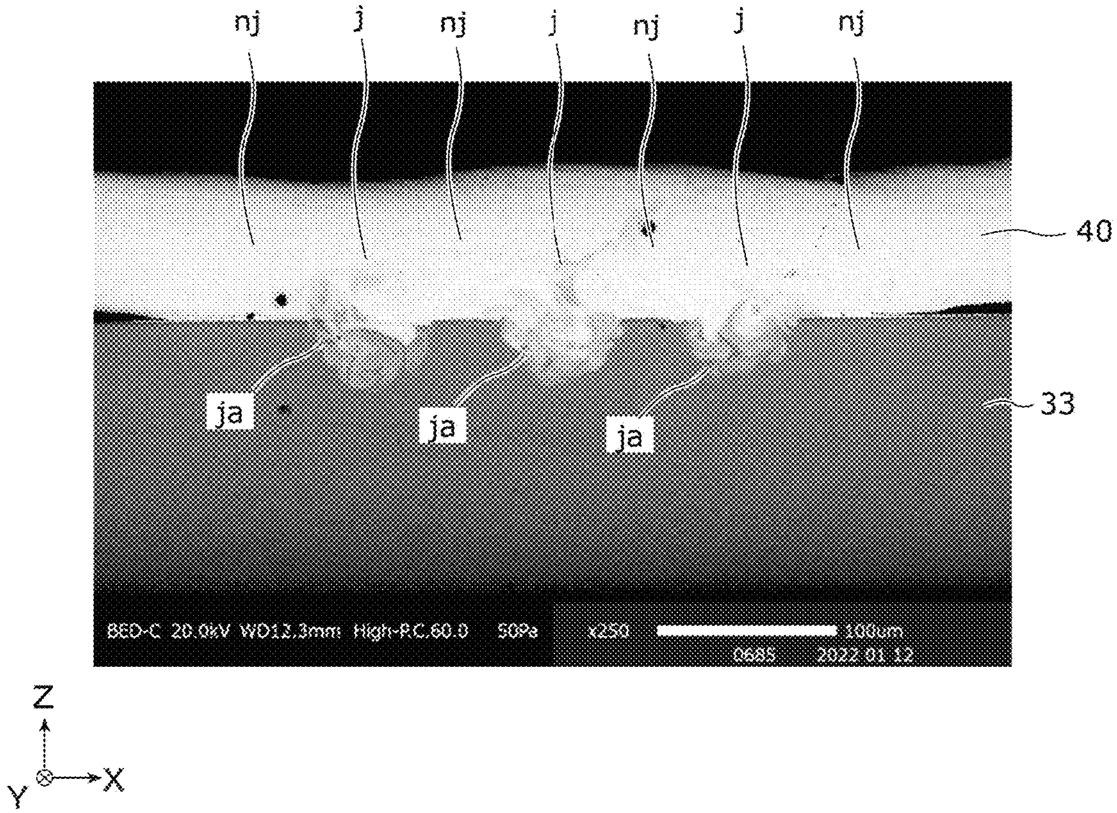
FIG. 11 represents a sectional image showing another example of joining the solder member to the terminal area of the switch.

FIG. 11 represents a sectional image showing another example of joining solder member 40 to terminal area 33 of switch 1. FIG. 11 represents a sectional image when, with solder member 40 placed on terminal area 33 of switch 1, solder member 40 is joined to terminal area 33 by applying laser beams L to three spots. As shown in the drawing, solder member 40 includes joint sites j that are molten and joined to terminal area 33, and non-joint site nj that is neither molten nor joined to terminal area 33. Joint sites j include alloy layer ja formed thereon.

Variation of Embodiment 1

Switch 1 according to a variation of Embodiment 1 will be described. This variation describes an example in which non-joint site nj of solder member 40A is in contact with terminal area 33.

Figure 12:
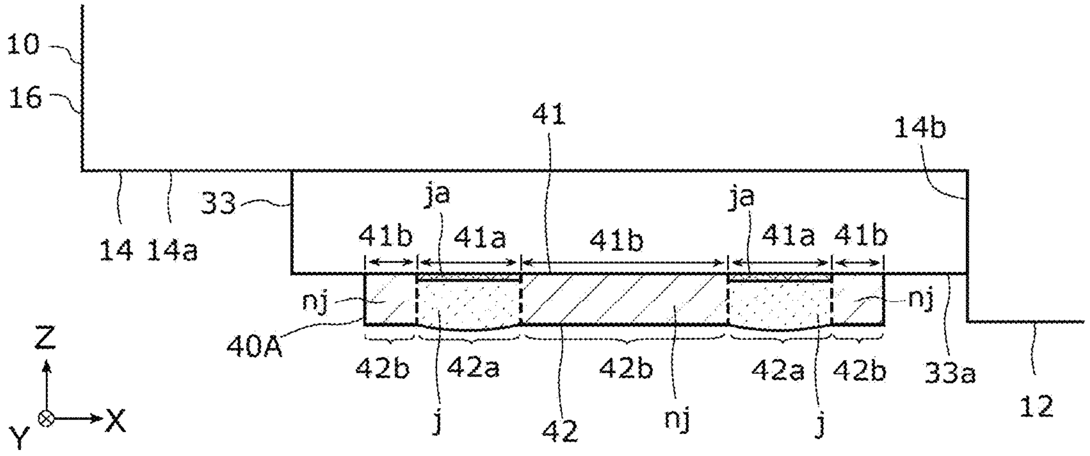
FIG. 12 is an enlarged view of the solder member on a switch according to a variation of Embodiment 1.

FIG. 12 is an enlarged view of solder member 40A of switch 1 according to the variation.

Solder member 40A is provided on terminal area 33 of fixed contact member 30. Solder member 40A is a plate- or sheet-like member with a predetermined thickness. Solder member 40A has a rectangular shape as viewed from the side of bottom surface 12.

Solder member 40A is soldered in part to terminal area 33. That is, solder member 40A includes joint sites j that are joined to terminal area 33, and non-joint site nj that is not joined to terminal area 33. The area of non-joint site nj of solder member 40A is larger than the area of a plurality of joint sites j.

Joint sites j include alloy layer ja that comes in contact with terminal area 33. Alloy layer ja includes a metal material for solder member 40A and a metal material for terminal area 33. For example, alloy layer ja may have a thickness of greater than or equal to 10 μm and less than or equal to 100 μm.

Solder member 40A has first surface 41 that faces terminal area 33, and second surface 42 that is located on the side opposite to first surface 41. In first surface 41, regions 41*a* included in joint sites j is joined to terminal area 33, and regions 41*b* included in non-joint site nj is not joined to terminal area 33. In the present variation, regions 41*b* included in non-joint site nj are in contact with terminal area 33. Note that gap g may be formed in part of the regions between regions 41*b* and terminal areas 33.

Second surface 42 includes first regions 42*a* that are included in joint sites j, and second regions 42*b* that are included in non-joint site nj. First regions 42*a* are irradiated with laser beams L and have joint traces formed thereon. Second regions 42*b* are not irradiated with laser beams L and have no joint traces formed thereon. First regions 42*a* of second surface 42 bulge outward of second regions 42*b* in a direction opposite to first surface 41. In other words, first regions 42*a* bulge in a direction opposite to top panel 11.

Note that first regions 42*a* of second surface 42 do not always bulge outward of second regions 42*b*. For example, first regions 42*a* may be at the same level as second regions 42*b*. Moreover, first regions 42*a* may be slightly recessed toward first surface 41 from second regions 42*b*.

In this way, in switch 1 according to the variation as well, solder member 40A includes joint sites j that are joined to terminal area 33 and non-joint site nj that is not joined to terminal area 33. This configuration eliminates the need to melt the whole of the solder material when providing solder member 40A on terminal areas 33 and only needs to melt part of the solder material. Thus, it is possible to reduce the likelihood that the solder material as a whole will suffer a change in quality. This suppresses a decrease in reliability of connection at the time of mounting.

Summary of Embodiment 1

As described above, switch 1 according to the present embodiment includes case 10, movable contact member 20 disposed on case 10, fixed contact members 30 buried in part in case 10, and solder member 40 provided on fixed contact member 30. Fixed contact members 30 include contact portion 31 that is contactable with movable contact member 20, and terminal areas 33 electrically connected to contact portion 31 and exposed out of case 10. Solder member 40 includes joint sites j that are joined to terminal areas 33, and non-joint site nj that is not joined to terminal areas 33.

Solder member 40 configured to include joint sites j and non-joint site nj eliminates the need to melt the whole of the solder material when providing solder member 40 on terminal areas 33. Thus, it is possible to suppress a change in quality of the solder material as a whole. This suppresses a decrease in reliability of connection at the time of mounting.

The area of non-joint site nj may be larger than the area of joint sites j.

In this case, when solder member 40 is provided on terminal areas 33, the area of non-molten portions of the solder material may become larger than the area of molten portions of the solder material. Thus, it is possible to increase the area of a portion of solder member 40 in which the quality of the solder material remains unchanged. This suppresses a decrease in reliability of connection at the time of mounting.

Moreover, gap g may be formed between non-joint site nj and terminal areas 33.

The presence of such gap g allows reliable formation of non-joint site nj where the solder material is not molten. Thus, it is possible to suppress a change in quality of the solder material as a whole. This suppresses a decrease in reliability of connection at the time of mounting.

Joint sites j may include alloy layer ja that comes in contact with terminal areas 33, and alloy layer ja may include a metal material for solder member 40 and a metal material for terminal areas 33.

This allows joint sites j to be firmly joined to terminal areas 33. Accordingly, it is possible to suppress a decrease in reliability of connection at the time of mounting.

Solder member 40 may have first surface 41 that faces terminal areas 33 and second surface 42 that is located on the side opposite to first surface 41. Second surface 42 may include first regions 42*a* included in joint sites j and second region 42*b* included in non-joint site nj, and second region 42*b* of second surface 42 may be flatter than first regions 42*a*.

Such flat second region 42*b* allows switch 1 to be maintained in a predetermined position when solder member 40 is brought into abutment with the circuit board at the time of mounting. Accordingly, it is possible to suppress a decrease in reliability of connection at the time of mounting.

Solder member 40A may have first surface 41 that faces terminal areas 33 and second surface 42 that is located on the side opposite to first surface 41. Second surface 42 may include first regions 42*a* included in joint sites j and second region 42*b* included in non-joint site nj. First regions 42*a* of second surface 42 may bulge outward of second region 42*b* in a direction opposite to first surface 41.

Such bulged first regions 42*a* allows confirmation of whether solder member 40A is secured to terminal areas 33 from outer appearance. Accordingly, it is possible to suppress a decrease in reliability of connection at the time of mounting.

Solder member 40 may include a plurality of joint sites j, and second surface 42 of solder member 40 may include a plurality of first region 42*a*.

The presence of a plurality of joint sites j of solder member 40 reduces the likelihood that solder member 40 will come off terminal areas 33, for example, when external forces acting in the direction of rotation are applied to solder member 40. Accordingly, it is possible to suppress a decrease in reliability of connection at the time of mounting.

Solder member 40 may have a rectangular shape as viewed in a direction perpendicular to second surface 42, and each of first regions 42*a* may be provided along the short side of rectangular solder member 40.

The presence of first regions 42*a* provided along the short side of solder member 40 reduces the likelihood that solder member 40 will come off terminal areas 33 when external forces acting in the direction of rotation are applied to solder member 40. Accordingly, it is possible to suppress a decrease in reliability of connection at the time of mounting.

Case 10 may have top panel 11, bottom surface 12, and dent bottom surfaces 14*a* located on the side closer to top panel 11 than bottom surface 12. Terminal area 33 may be exposed out of case 10 while being in contact with dent bottom surfaces 14*a*, and terminal bottom surfaces 33*a*, which are the bottom surfaces of terminal areas 33, may be located on the side closer to top panel 11 than bottom surface 12.

This allows bottom surface 12 of case 10 to abut on the circuit board after mounting. Thus, even if pressure forces are applied to switch 1, it is possible to reduce the application of loads to the solder joints between terminal areas 33 and the circuit board. Accordingly, it is possible to suppress a decrease in reliability of connection at the time of mounting.

Solder member 40 may be arranged such that first surface 41 is located on the side closer to top panel 11 of case 10 than bottom surface 12 and second surface 42 is located so as to protrude outward of bottom surface 12 of case 10.

Since second surface 42 of solder member 40 protrudes outward of bottom surface 12, it is possible to bring solder member 40 into abutment with the circuit board at the time of mounting, and to melt the solder material in this abutment condition. It is also possible to increase the thickness of solder member 40 and to secure the necessary amount of solder at the time of mounting. This suppresses a decrease in reliability of connection at the time of mounting.

That is, the switch according to the present disclosure has the following aspects.

(Aspect 1)

Aspect 1 is a switch that includes a case, a movable contact member disposed in the case, a fixed contact member buried in part in the case, and a solder member provided on the fixed contact member. The fixed contact member includes a contact portion that is contactable with the movable contact member and a terminal area that is electrically connected to the contact portion and exposed out of the case. The solder member includes a joint site the is jointed to the terminal area and a non-joint site that is not joined to the terminal area.

(Aspect 2)

Aspect 2 is the switch described in Aspect 1, in which the non-joint site has a large area than the joint site.

(Aspect 3)

Aspect 3 is the switch described in Aspect 1 or 2, in which a gap is provided between the non-joint site and the terminal area.

(Aspect 4)

Aspect 4 is the switch described in any one of Aspects 1 to 3, in which the joint site includes an alloy layer that comes in contact with the terminal area, and the alloy layer includes a metal material for the solder member and a metal material for the terminal area.

(Aspect 5)

Aspect 5 is the switch described in any one of Aspects 1 to 4, in which the solder member has a first surface facing the terminal area and a second surface located on a side opposite to the first surface, the second surface includes a first region included in the joint site and a second region included in the non-joint site, and on the second surface, the second region is flatter than the first region.

(Aspect 6)

Aspect 6 is the switch described in any one of Aspects 1 to 4, in which the solder member has a first surface facing the terminal area and a second surface located on a side opposite to the first surface, the second surface includes a first region included in the joint site and a second region included in the non-joint site, and on the second surface, the first region bulges outward of the second region in a direction opposite to the first surface.

(Aspect 7)

Aspect 7 is the switch described in Aspect 5 or 6, in which the solder member includes a plurality of joint sites, each of the plurality of joint sites being the joint site, and the second surface of the solder member includes a plurality of first regions, each of the plurality of first regions being the first region.

(Aspect 8)

Aspect 8 is the switch described in Aspect 7, in which the solder member has a rectangular shape as viewed in a direction perpendicular to the second surface, and each of the plurality of first regions is provided along a short side of the solder member having the rectangular shape.

(Aspect 9)

Aspect 9 is the switch described in any one of Aspects 5 to 8, in which the case includes a top panel, a bottom surface, and a dent bottom surface located on a side closer to the top panel than the bottom surface, the terminal area is exposed out of the case while being in contact with the dent bottom surface, and the terminal area has a bottom surface that is a terminal bottom surface located on a side closer to the top panel than the bottom surface.

(Aspect 10)

Aspect 10 is the switch described in Aspect 9, in which the solder member is arranged so that the first surface is located on a side closer to the top panel of the case than the bottom surface of the case and the second surface is located to protrude out of the bottom surface of the case.

Embodiment 2

(Configuration of Switch)

A configuration of switch 101 according to Embodiment 2 will be described.

Embodiment 2 describes an example in which each terminal area 33 includes tentative attachment region T1. Tentative attachment region T1 may be provided in order to, for example, reduce the likelihood that the position of solder member 40 placed on terminal area 33 will be displaced or solder member 40 will come off before or at the time of joining solder member 40 to terminal area 33.

As in Embodiment 1, switch 101 according to Embodiment 2 includes case 10, movable contact member 20, first and second fixed contact members 30*a* and 30*b*, sheet protector 60, and pressure member 50 (not shown). Switch 101 according to Embodiment 2 differs in part of the configurations of terminal areas 33 of first and second fixed contact members 30*a* and 30*b* from switch 1 according to Embodiment 1. The following description is given of a configuration that characterizes switch 101 according to Embodiment 2.

Figure 13:
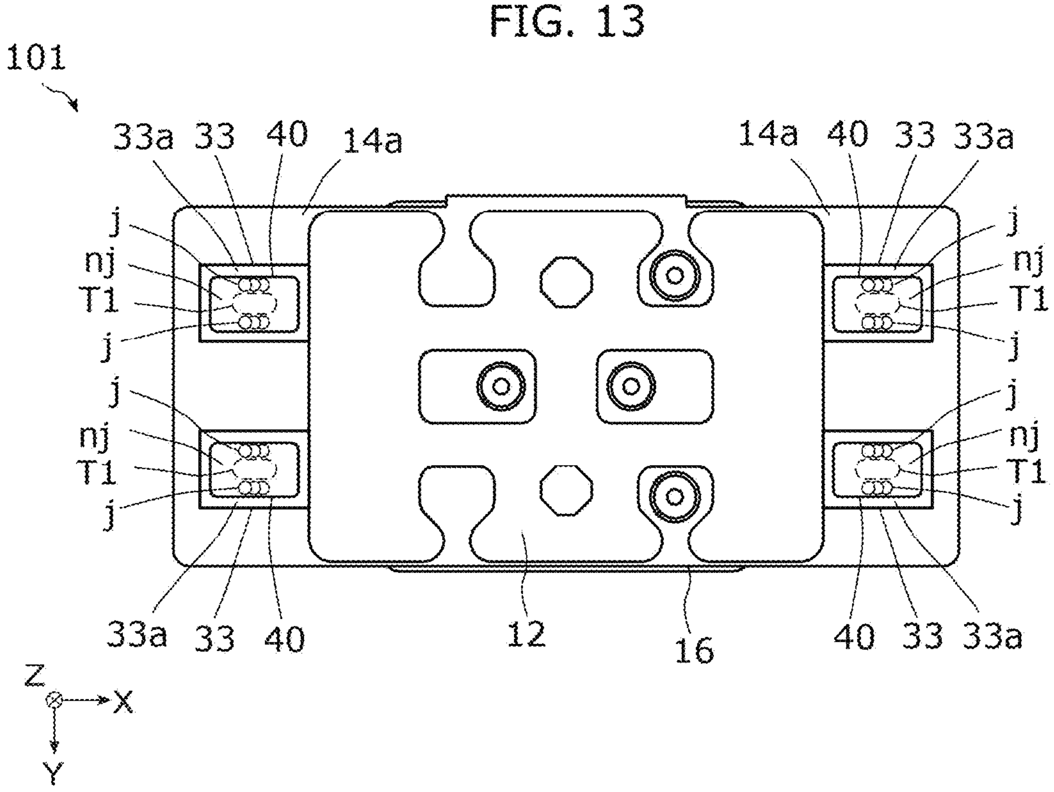
FIG. 13 is a bottom view of a switch according to Embodiment 2.
Figure 14:
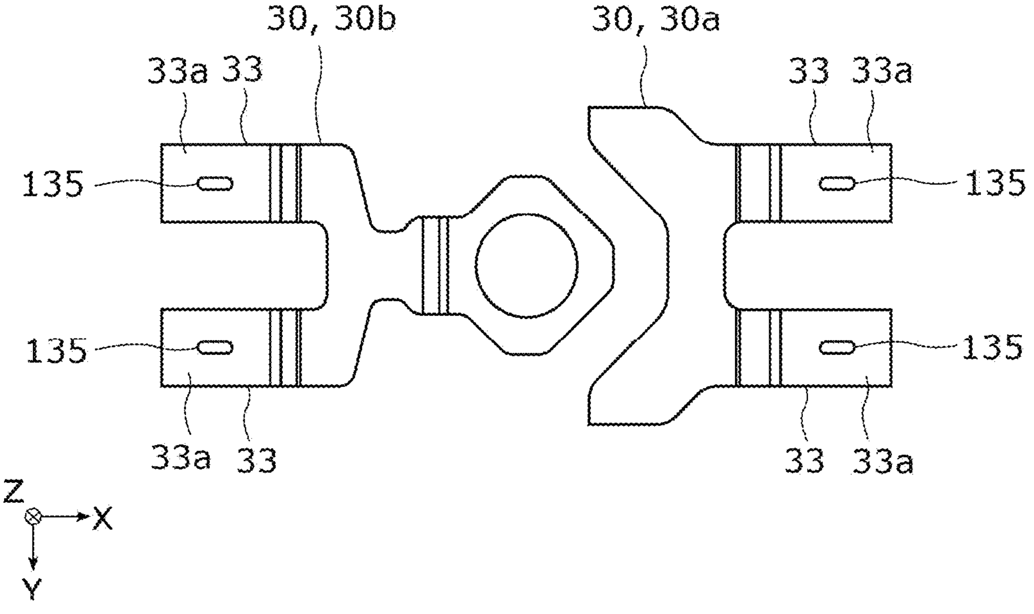
FIG. 14 is a bottom view of a fixed contact member of the switch according to Embodiment 2.
Figure 15:
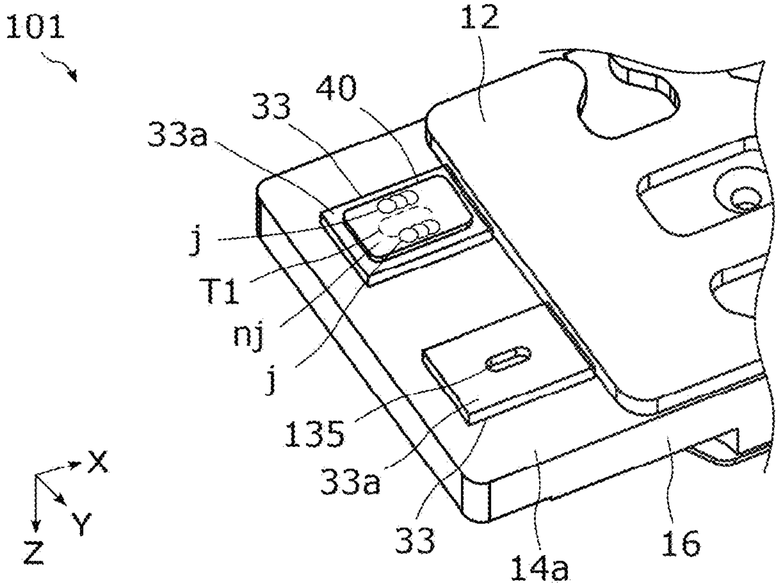
FIG. 15 is a perspective view of a solder member and a terminal area of the switch according to Embodiment 2.
Figure 16:
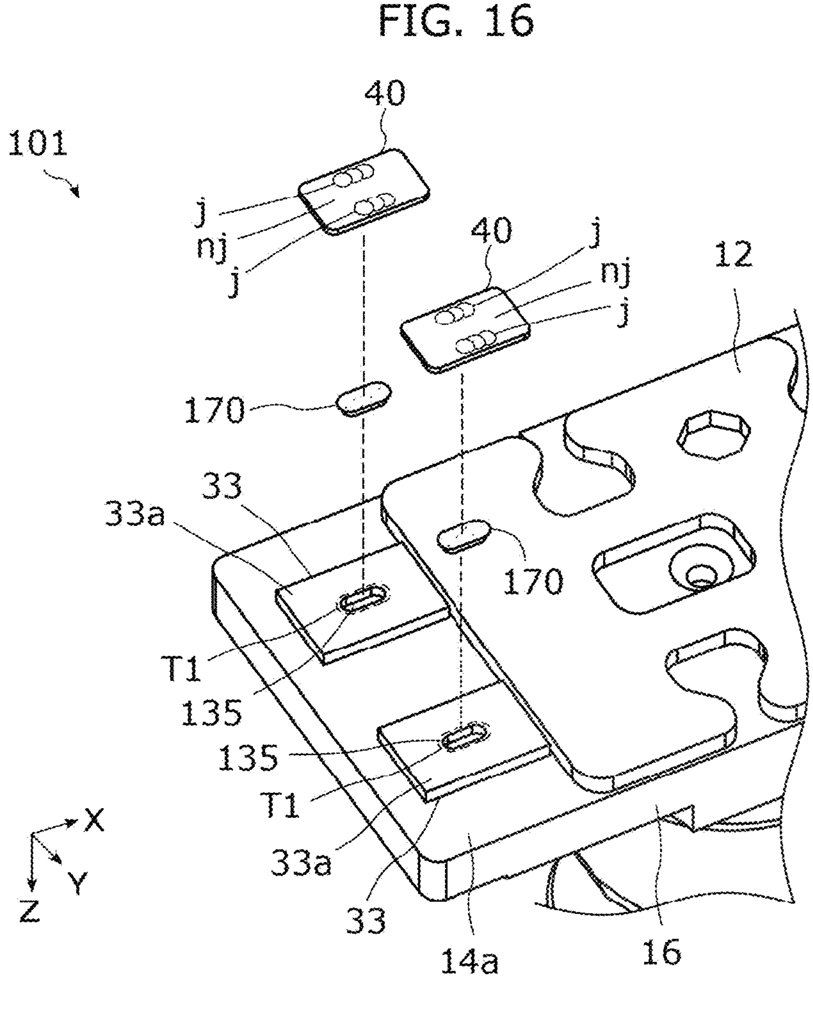
FIG. 16 is a diagram showing a state in which the solder member is separated from the terminal area according to Embodiment 2.

FIG. 13 is a bottom view of switch 101 according to Embodiment 2. FIG. 14 is a bottom view of fixed contact members of switch 101. FIG. 15 is a perspective view showing solder member 40 and terminal areas 33 of switch 101. FIG. 16 shows a state in which solder member 40 is separated from terminal areas 33.

FIG. 15 shows a state in which one of two terminal areas 33 that is located on the minus side in the Y direction is tentatively attached and joined to solder member 40, and the other terminal area 33 that is located on the plus side in the Y direction has no solder member 40 tentatively attached thereto. FIG. 16 shows a state in which binder 170 is also separated from terminal areas 33.

Each terminal area 33 of switch 101 according to Embodiment 2 includes tentative attachment region T1 that is contactable with solder member 40. Tentative attachment region T1 may, for example, be a region for tentatively securing solder member 40 to terminal area 33 in order to reduce the likelihood that the position of solder member 40 placed on terminal area 33 will be displaced or solder member 40 will come off before or at the time of joining solder member 40 to terminal area 33.

Tentative attachment region T1 is located in a region different to regions that correspond to joint sites j, as viewed in a direction in which terminal area 33 and solder member 40 are arranged adjacent to each other, i.e., as viewed in the Z direction in FIG. 13. For example, tentative attachment region T1, as viewed in the Z direction, may be located in a region that corresponds to non-joint site nj. In the example shown in the drawing, tentative attachment region T1 is located in a region between a plurality of joint sites j.

As shown in FIG. 16, tentative attachment region T1 is provided on the side of terminal bottom surface 33*a* of terminal area 33. Tentative attachment region T1 includes a groove-shaped recessed portion 135, and binder 170 is provided in recessed portion 135. Binder 170 is a material for tentatively attaching solder member 40 to terminal area 33. Recessed portion 135 is a pocket for storing binder 170.

As shown in FIGS. 14 and 15, recessed portion 135 has a rectangular shape or an oval shape as viewed in the Z direction. The oval shape includes a long-hole shape and an elliptical shape. Rectangular or oval recessed portion 135 reduces the likelihood that solder member 40 will be rotated relative to terminal area 33 at the time of tentatively attaching solder member 40 to terminal area 33.

Figure 17:
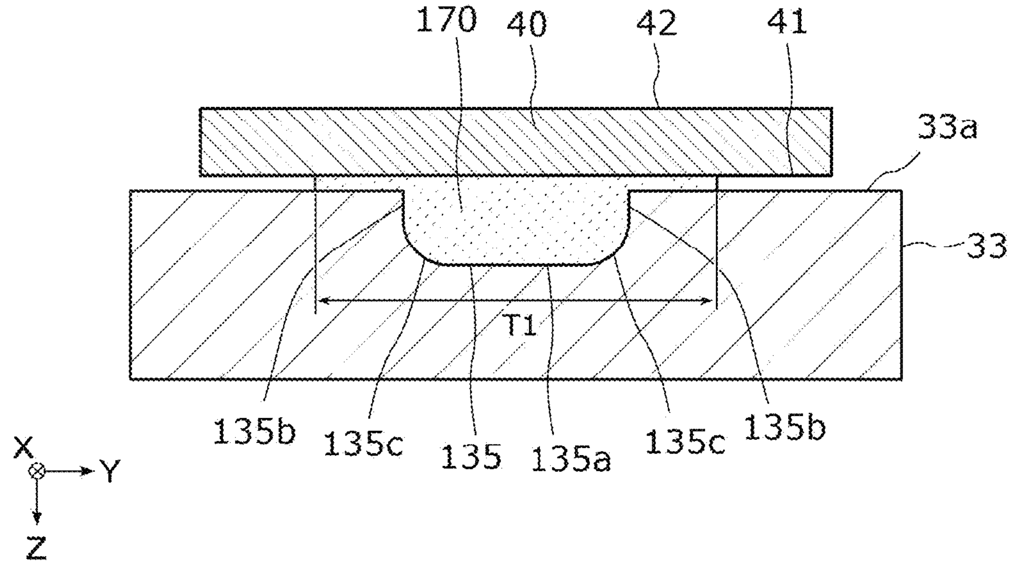
FIG. 17 is a schematic diagram showing a section in which the solder member is tentatively attached to the terminal area according to Embodiment 2.

FIG. 17 is a schematic diagram showing a section when solder member 40 is tentatively attached to terminal area 33. Although in FIG. 17, interstices are seen between terminal area 33 and solder member 40, in actuality no interstices exist and terminal area 33 and solder member 40 are in contact with each other.

As shown in FIG. 17, recessed portion 135 has bottom 135*a* and a plurality of walls 135*b*. Corner portion 135*c* that connects bottom 135*a* and walls 135*b* has an R-shaped curved surface and roundness. The radius of curvature of the curved surface may, for example, be greater than or equal to 0.1 times and less than or equal to 1.0 times of the depth of recessed portion 135. The reason why corner portion 135*c* is made to have an R-shaped curved surface is in order to reduce the occurrence of biting or retention of air voids in corner portion 135*c* when binder 170 is provided in recessed portion 135.

Recessed portion 135 may be formed by, for example, laser or die press forming. Recessed portion 135 may be formed in terminal area 33 before insert molding of fixed contact members 30 using a resin (see FIG. 14), or may be formed in terminal area 33 after the insert molding.

Although one recessed portion 135 is shown in FIG. 17, the number of recessed portions 135 is not limited to one, and tentative attachment region T1 may include a plurality of recessed portions 135. For example, recessed portion 135 may have a width of less than or equal to 0.1 mm and may have a size that allows binder 170 provided in recessed portion 135 to be held in recessed portion 135 by surface tension or the like.

Binder 170 is a material provided between terminal area 33 and solder member 40 and may, for example, be a flux or a material that contains an acrylic- or epoxy-based resin. Binder 170 is a liquid having some degree of viscosity. For example, binder 170 may desirably have viscosity higher than or equal to 1 Pa·s and lower than or equal to 100 Pa·s. Binder 170 is also provided outside recessed portion 135 so as to overflow from recessed portion 135. Binder 170 that is provided also outside recessed portion 135 fills recessed portion 135 and helps tentatively attaching solder member 40 to terminal area 33 with reliability.

Figure 18:
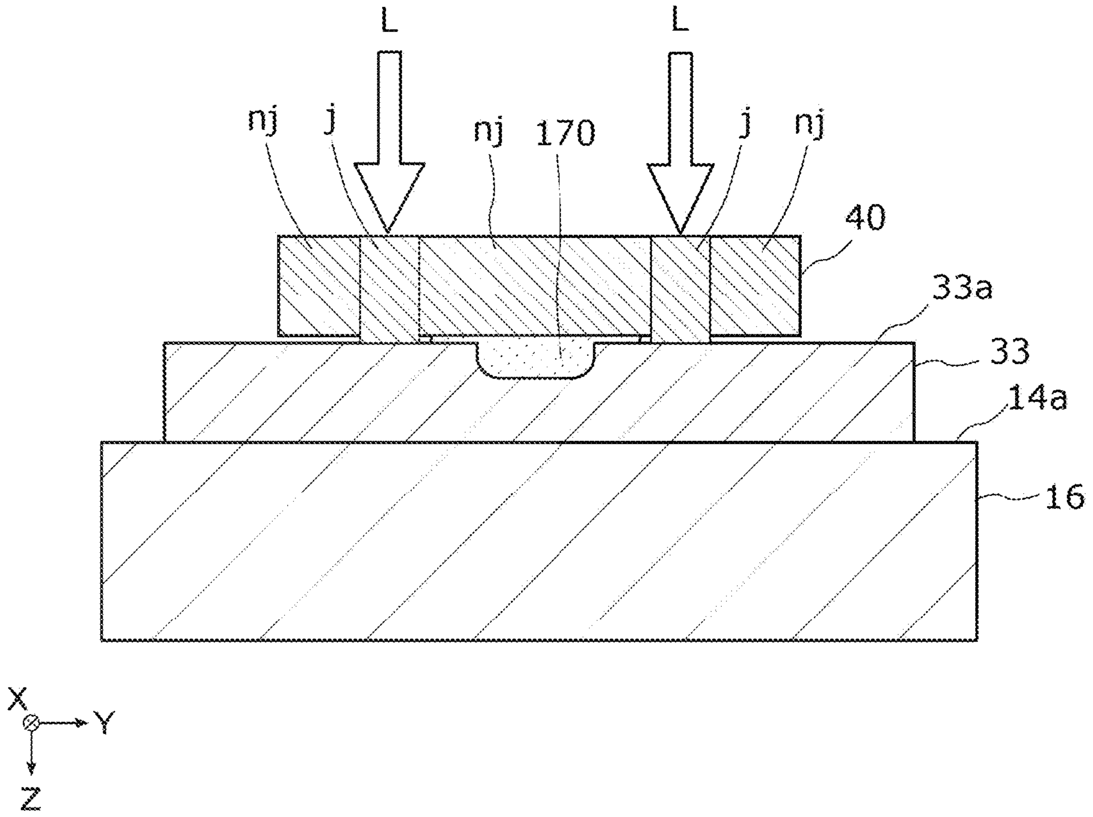
FIG. 18 is a diagram showing a state in which the solder member is tentatively attached to the terminal area before joined to the terminal area.

FIG. 18 shows a state in which solder member 40 is tentatively attached to terminal area 33 before joined to terminal area 33. By way of example, FIG. 18 shows a state in which solder member 40 is joined by laser beams L. In this way, by tentatively attaching solder member 40 to terminal area 33 before joining it to terminal area 33, it is possible to reduce the likelihood that the position of solder member 40 placed on terminal area 33 will be displaced or solder member 40 will come off before or at the time of joining.

Variation 1 of Embodiment 2

Switch 101 according to Variation 1 of Embodiment 2 will be described. Variation 1 describes an example in which recessed portion 135 has a countersunk-hole shape.

Figure 19:
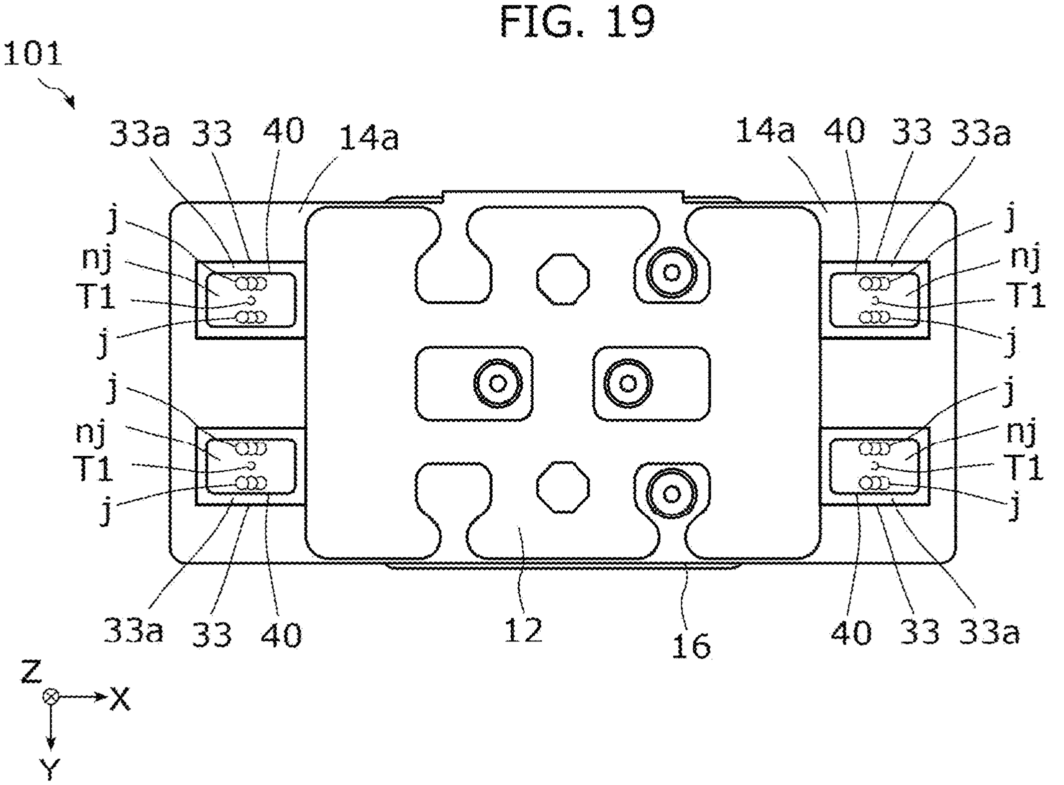
FIG. 19 is a bottom view of a switch according to Variation 1 of Embodiment 2.
Figure 20:
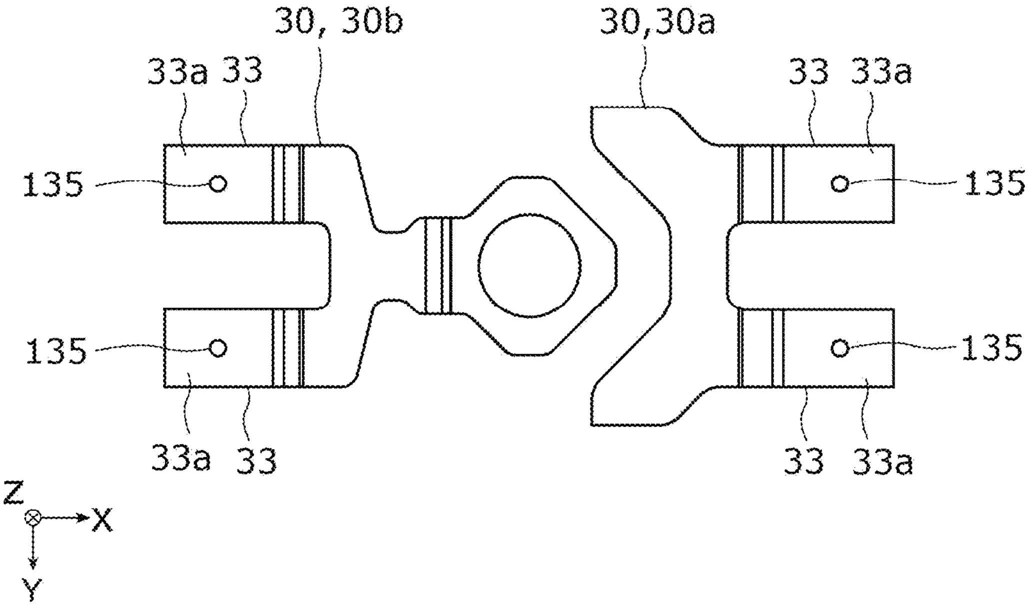
FIG. 20 is a bottom view of the fixed contact member of the switch according to Variation 1 of Embodiment 2.
Figure 21:
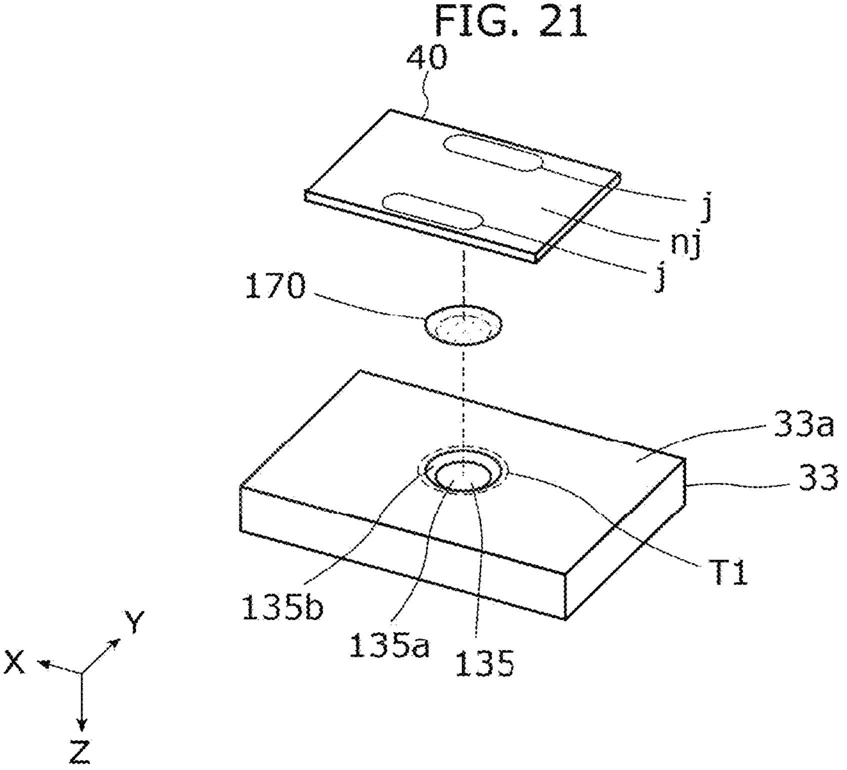
FIG. 21 is a diagram showing a state in which the solder member is separated from the terminal area of the switch according to Variation 1 of Embodiment 2.

FIG. 19 is a bottom view of switch 101 according to Variation 1 of Embodiment 2. FIG. 20 is a bottom view of fixed contact members 30 of switch 101 according to Variation 1. FIG. 21 is a diagram showing a state in which solder member 40 is separated from terminal area 33 of switch 101. Note that FIG. 21 shows a state in which binder 170 is also separated from terminal area 33.

Each terminal area 33 of switch 101 according to Variation 1 includes tentative attachment region T1 that is contactable with solder member 40. When viewed in the Z direction in FIG. 19, tentative attachment region T1 is located in a region different from regions that correspond to joint sites j. For example, when viewed in the Z direction, tentative attachment region T1 may be located in a region that corresponds to non-joint site nj. In the example shown in FIG. 19, tentative attachment region T1 is located in a region between a plurality of joint sites j.

Tentative attachment region T1 is provided on the side of terminal bottom surface 33*a* of terminal area 33. Tentative attachment region T1 includes recessed portion 135 having a countersunk-hole shape, and binder 170 is provided in recessed portion 135.

As shown in FIG. 20, when viewed in the Z direction, recessed portion 135 has a circular shape. As shown in FIG. 21, recessed portion 135 has bottom 135*a* and walls 135*b*. A corner portion that connects bottom 135*a* and walls 135*b* may have an R-shaped curved surface. Note that walls 135*b* may be inclined relative to bottom 135*a* or terminal bottom surface 33*a*. Although one recessed portion 135 is shown in tentative attachment region T1 in FIG. 19, the number of recessed portions 135 is not limited to one, and tentative attachment region T1 of terminal area 33 may include a plurality of recessed portions 135. For example, recessed portion 135 may have a diameter of less than or equal to 0.1 mm and may have a size that allows binder 170 provided in recessed portion 135 to be held in recessed portion 135 by surface tension or the like.

In Variation 1 as well, solder member 40 is tentatively attached to terminal area 33 before joined to terminal area 33. This reduces the likelihood that the position of solder member 40 placed on terminal area 33 may be displaced or solder member 40 may come off before or at the time of joining solder member 40 to terminal area 33.

Variation 2 of Embodiment 2

Switch 101 according to Variation 2 of Embodiment 2 will be described. Variation 2 describes an example in which binder 170 is provided not in a recessed portion but on terminal bottom surface 33*a* of terminal area 33.

Figure 22:
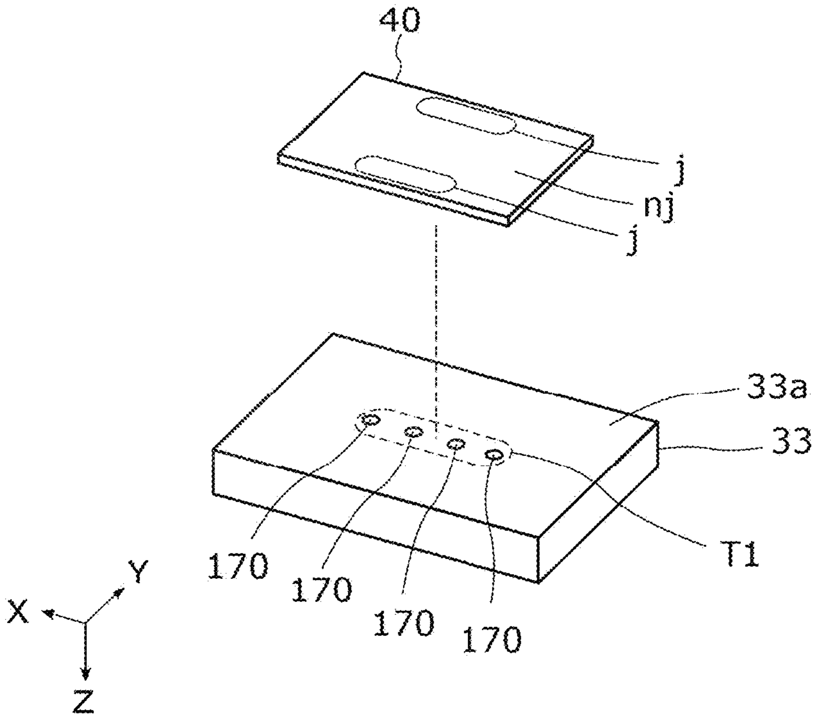
FIG. 22 is a diagram showing a state in which the solder member is separated from the terminal area according to Variation 2 of Embodiment 2.
Figure 23:
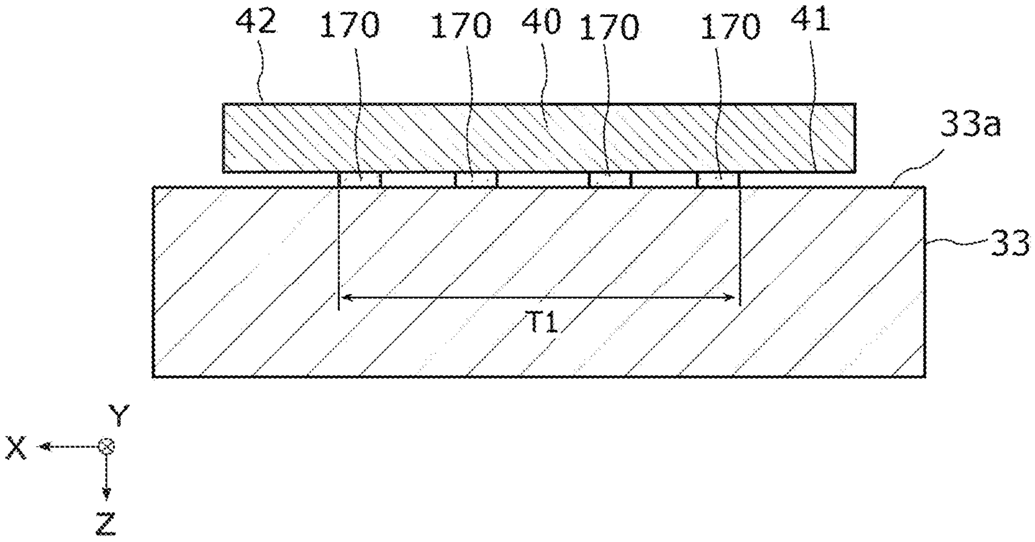
FIG. 23 is a schematic diagram showing a section in which the solder member is tentatively attached to the terminal area according to Variation 2 of Embodiment 2.

FIG. 22 is a diagram showing a state in which solder member 40 is separated from terminal area 33 of switch 101. FIG. 23 is a schematic diagram showing a section when solder member 40 is tentatively attached to terminal area 33.

Terminal area 33 of switch 101 according to Variation 2 of Embodiment 2 includes tentative attachment region T1 that is contactable with solder member 40.

When viewed in the Z direction, tentative attachment region T1 is located in a region different from regions that correspond to joint sites j. For example, when viewed in the Z direction, tentative attachment region T1 may be located in a region that corresponds to non-joint site nj. In the example shown in the drawing, tentative attachment region T1 is located in a region between a plurality of joint sites j.

As shown in FIGS. 22 and 23, tentative attachment region T1 is provided on the side of terminal bottom surface 33*a* of terminal area 33. In this example, a plurality of binders 170 are provided between terminal area 33 and solder member 40 to form tentative attachment region T1. For example, binders 170 may be water or ethanol, and the amount of each binder may be greater than or equal to 0.001 microliters (μL) and less than or equal to 0.1 μL. Binders 170 may be applied to terminal bottom surface 33*a* of terminal area 33 by, for example, an inkjet or a dispenser. Note that, instead of a plurality of binders 170, an integrally connected single binder 170 may be provided in tentative attachment region T1.

In Variation 2 as well, solder member 40 is tentatively attached to terminal area 33 before joined to terminal area 33. This reduces the likelihood that the position of solder member 40 placed on terminal area 33 may be displaced or solder member 40 may come off before or at the time of joining solder member 40 to terminal area 33.

Variation 3 of Embodiment 2

Switch 101 according to Variation 3 of Embodiment 2 will be described. Variation 3 describes an example in which tentative attachment region T1 is provided in solder member 40.

Figure 24:
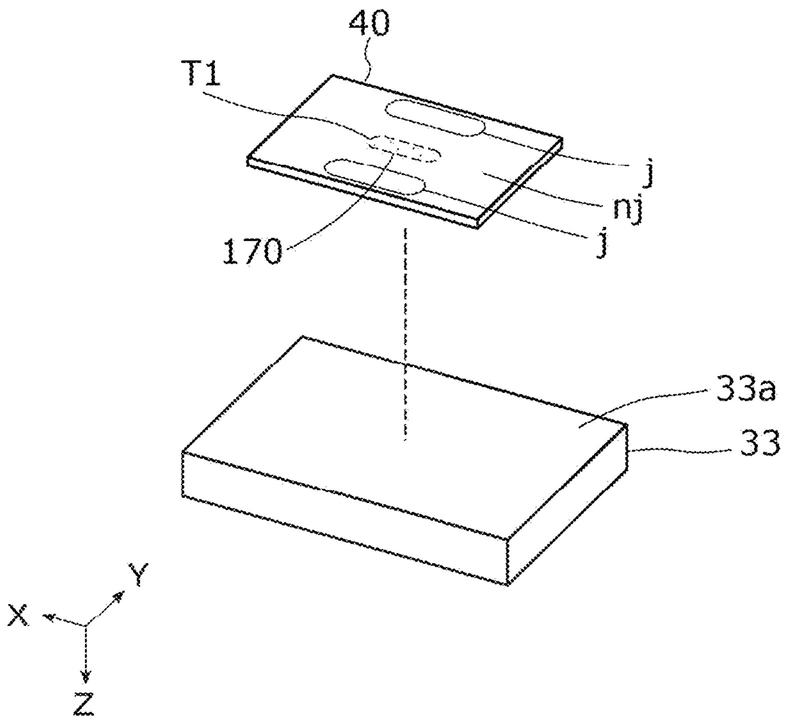
FIG. 24 is a diagram showing a state in which the solder member is separated from the terminal area of a switch according to Variation 3 of Embodiment 2.
Figure 25:
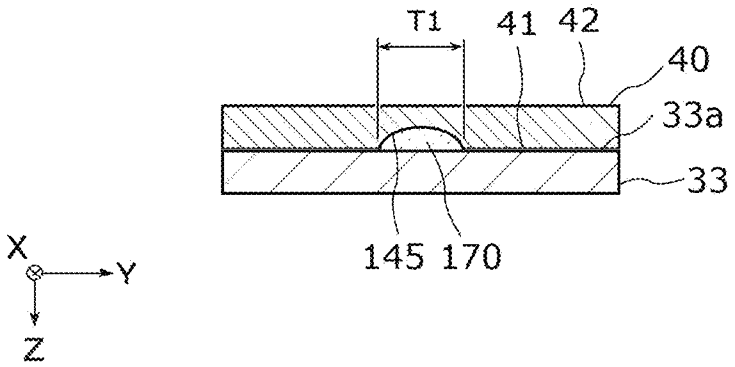
FIG. 25 is a schematic diagram showing a section in which the solder member is tentatively attached to the terminal area of the switch according to Variation 3 of Embodiment 2.

FIG. 24 is a diagram showing a state in which solder member 40 is separated from terminal area 33 of switch 101 according to Variation 3 of Embodiment 2. FIG. 25 is a schematic diagram showing a section when solder member 40 is tentatively attached to terminal area 33 of switch 101.

When viewed in the Z direction, solder member 40 of switch 101 according to Variation 3 of Embodiment 2 includes tentative attachment region T1 that is contactable with terminal area 33. Tentative attachment region T1 is located in a region different from regions that correspond to joint sites j. For example, when viewed in the Z direction, tentative attachment region T1 may be located in a region that corresponds to non-joint site nj. Tentative attachment region T1 is located in a region between a plurality of joint sites j.

As shown in FIG. 25, tentative attachment region T1 according to Variation 3 is provided on the side of first surface 41 of solder member 40. Tentative attachment region T1 includes recessed portion 145, and binder 170 is provided in recessed portion 145. Recessed portion 145 is a pocket for storing binder 170. When viewed in the Z direction, recessed portion 145 has a rectangular shape, an oval shape, or a circular shape. Note that second surface 42 of solder member 40 is flat before joined by laser or the like.

Recessed portion 145 has an arcuate shape and roundness as viewed in section. For example, recessed portion 145 may be formed by die press forming or the like. Although one recessed portion 145 is shown in FIG. 24, the number of recessed portions 145 is not limited to one, and tentative attachment region T1 of solder member 40 may include a plurality of recessed portions 145. For example, recessed portion 145 may have a width of less than or equal to 0.1 mm and may desirably have a size that allows binder 170 provided in recessed portion 145 to be held in recessed portion 145 by surface tension or the like.

In Variation 3 as well, solder member 40 is tentatively attached to terminal area 33 before joined to terminal area 33. This reduces the likelihood that the position of solder member 40 placed on terminal area 33 may be displaced or solder member 40 may come off before or at the time of joining solder member 40 to terminal area 33.

Embodiment 3

Switch 101A according to Embodiment 3 will be described. Embodiment 3 describes an example in which tentative attachment region T1 includes dent portion 136, and part of solder member 40 is pressed in dent portion 136.

As in Embodiment 1, switch 101A according to Embodiment 3 includes case 10, movable contact member 20, first and second fixed contact members 30*a* and 30*b*, sheet protector 60, and pressure member 50 (not shown). Switch 101A according to Embodiment 3 differs in part of the configurations of terminal areas 33 of first and second fixed contact members 30*a* and 30*b* from switch 1 according to Embodiment 1. The following description is given of a configuration that characterizes switch 101A according to Embodiment 3.

Figure 26:
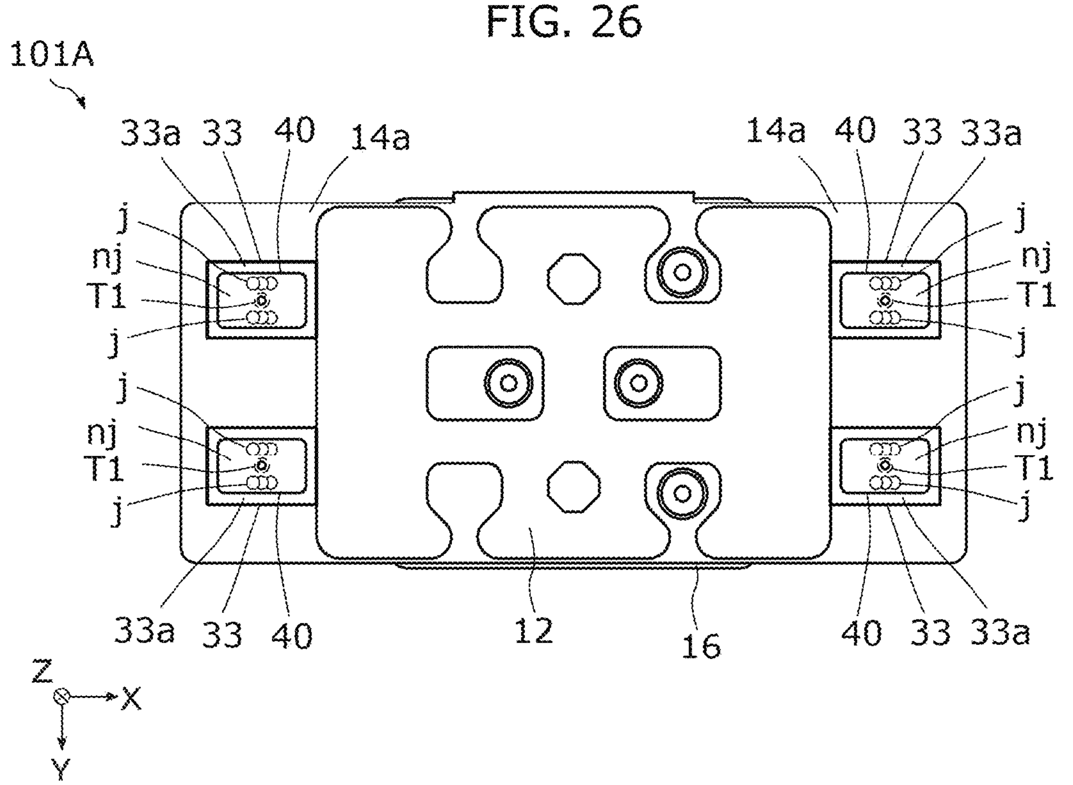
FIG. 26 is a bottom view of the switch according to Embodiment 3.
Figure 27:
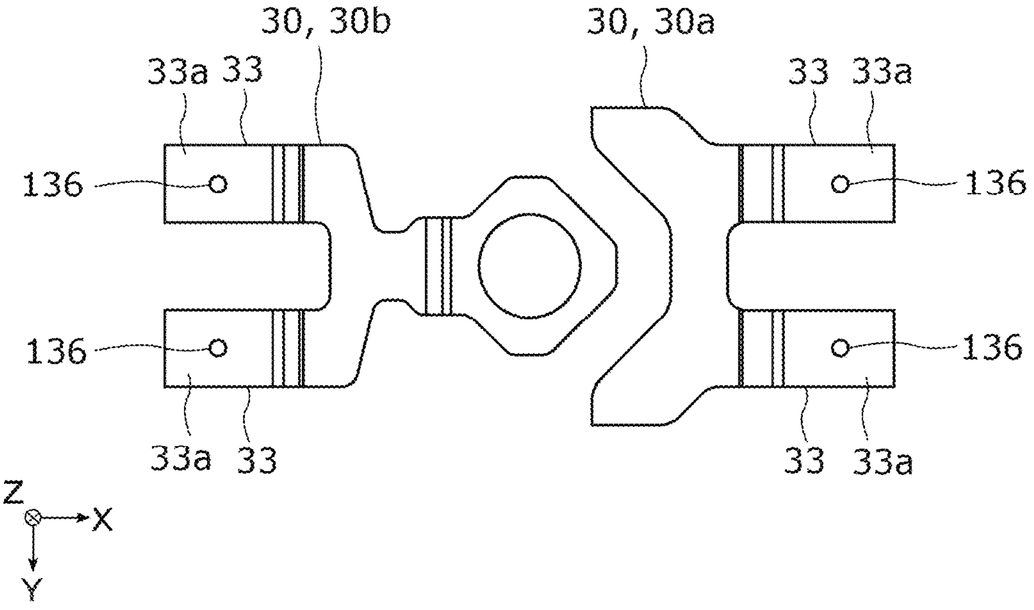
FIG. 27 is a bottom view of the fixed contact member of the switch according to Embodiment 3.
Figure 28:
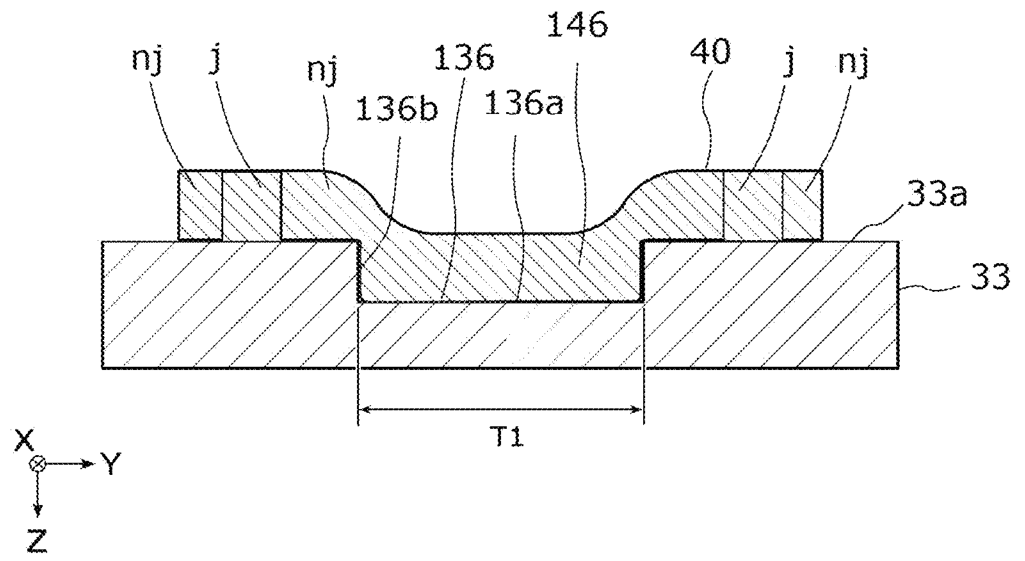
FIG. 28 is a sectional view showing the solder member and the terminal area of the switch according to Embodiment 3.
Figure 29:
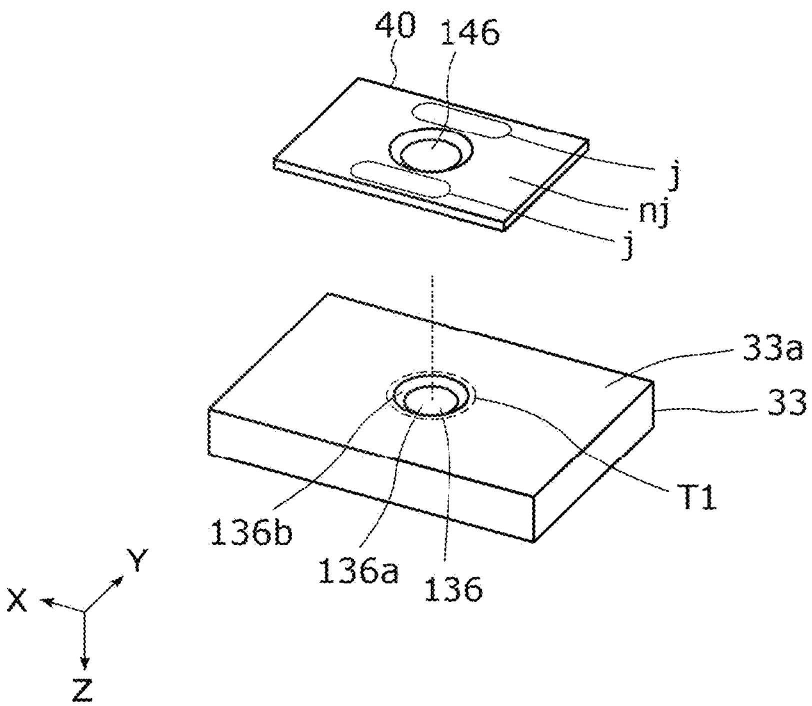
FIG. 29 is a diagram showing a state in which the solder member is separated from the terminal area according to Embodiment 3.

FIG. 26 is a bottom view of switch 101A according to Embodiment 3. FIG. 27 is a bottom view of fixed contact members 30 of switch 101A. FIG. 28 is a sectional view showing solder member 40 and terminal area 33 of switch 101A. FIG. 29 is a diagram showing a state in which solder member 40 is separated from terminal area 33 of switch 101A.

As shown in FIG. 26, each terminal area 33 of switch 101A according to Embodiment 3 includes tentative attachment region T1 that is contactable with solder member 40. Tentative attachment region T1 is located in a region different from regions that correspond to joint sites j, when viewed in a direction in which terminal area 33 and solder member 40 are arranged adjacent to each other, i.e., when viewed in the Z direction in FIG. 26. For example, when viewed in the Z direction, tentative attachment region T1 is located in a region that corresponds to non-joint site nj. In the example shown in FIG. 26, tentative attachment region T1 is located in a region between a plurality of joint sites j.

Tentative attachment region T1 is provided on the side of terminal bottom surface 33*a* of terminal area 33. Tentative attachment region T1 includes dent portion 136, and central portion 146 of solder member 40 is pressed in dent portion 136. Dent portion 136 is an engaging portion into which central portion 146 of solder member 40 is fitted.

As shown in FIG. 27, when viewed in the Z direction, each dent portion 136 has a circular shape. As shown in FIGS. 28 and 29, dent portion 136 has bottom 136*a* and walls 136*b*. Note that walls 136*b* may be inclined relative to bottom 136*a* or terminal bottom surface 33*a*. When viewed in the Z direction, dent portion 136 may have a rectangular shape or an oval shape.

Figure 30A:
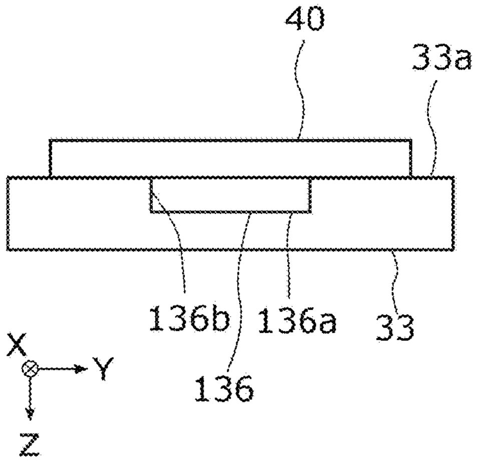
FIG. 30A is a diagram showing one example of a dent portion of the terminal area according to Embodiment 3.
Figure 30B:
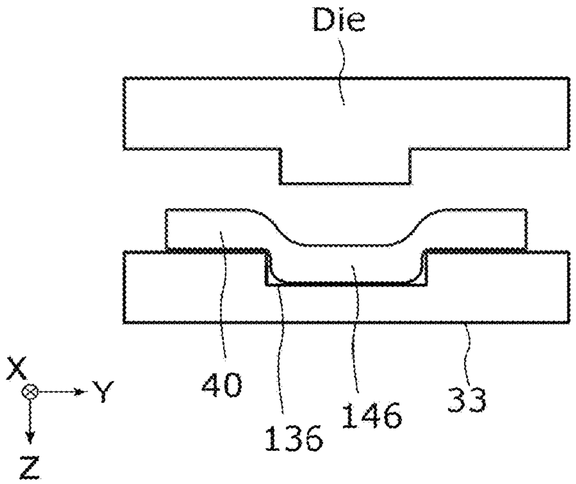
FIG. 30B is a diagram showing one example of a dent portion of the terminal area according to Embodiment 3.

FIGS. 30A and 30B shows one example of dent portion 136 of terminal area 33. FIG. 30A shows a state in which solder member 40 is arranged on terminal area 33 that includes dent portion 136, and FIG. 30B shows a state in which solder member 40 is subjected to die press forming so that central portion 146 of solder member 40 is pressed into dent portion 136.

Figure 31:
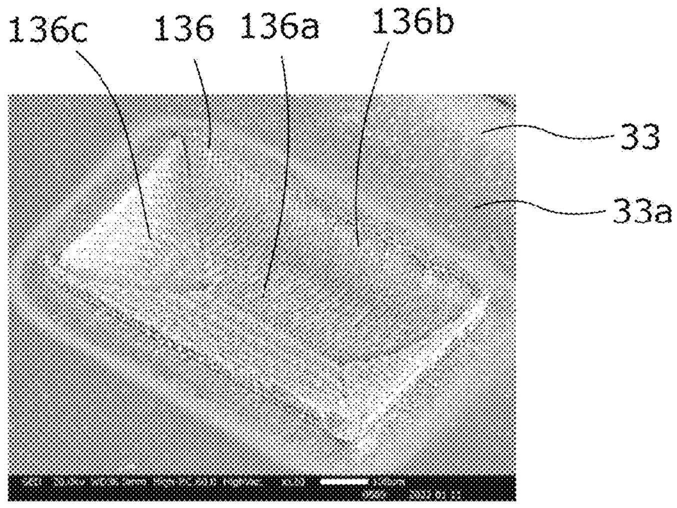
FIG. 31 represents an image showing another example of the dent portion of the terminal area according to Embodiment 3.

FIG. 31 represents an image showing another example of dent portion 136 of terminal area 33.

FIG. 31 shows an example in which part of terminal area 33 is removed by laser beams L to form dent portion 136. As shown in FIG. 31, corner portion 136*c* that connects bottom 136*a* and walls 136*b* has an R-shaped curved surface and roundness. The outer periphery of dent portion 136 is at a slightly higher level than the height of terminal bottom surface 33*a* of terminal area 33. For example, the outer peripheral region of dent portion 136 may be bowed into a convex shape. The convex shape of the outer peripheral region of dent portion 136 allows solder member 40 to make inroads into the convex outer peripheral region when pressed in terminal area 33 so as to be tentatively attached firmly to terminal area 33.

Dent portion 136 may be formed in terminal area 33 before insert molding of fixed contact members 30 using a resin, or may be formed in terminal area 33 after the insert molding.

In this way, in Embodiment 3, solder member 40 is tentatively attached to terminal area 33 before joined to terminal area 33. This reduces the likelihood that the position of solder member 40 placed on terminal area 33 will be displaced or solder member 40 will come off before or at the time of joining solder member 40 to terminal area 33.

Embodiment 4

A configuration of switch 1016 according to Embodiment 4 will be described. Embodiment 4 describes an example in which in tentative attachment region T1, terminal area 33 and solder member 40 are tentatively attached to each other by the anchor effect or by pressure welding.

As in Embodiment 1, switch 1016 according to Embodiment 4 includes case 10, movable contact member 20, first and second fixed contact members 30*a* and 30*b*, sheet protector 60, and pressure member 50 (not shown). Switch 1016 according to Embodiment 4 differs in part of the configurations of terminal areas 33 of first and second fixed contact members 30*a* and 30*b* from switch 1 according to Embodiment 1. The following description is given of a configuration that characterizes switch 1016 according to Embodiment 4.

Figure 32:
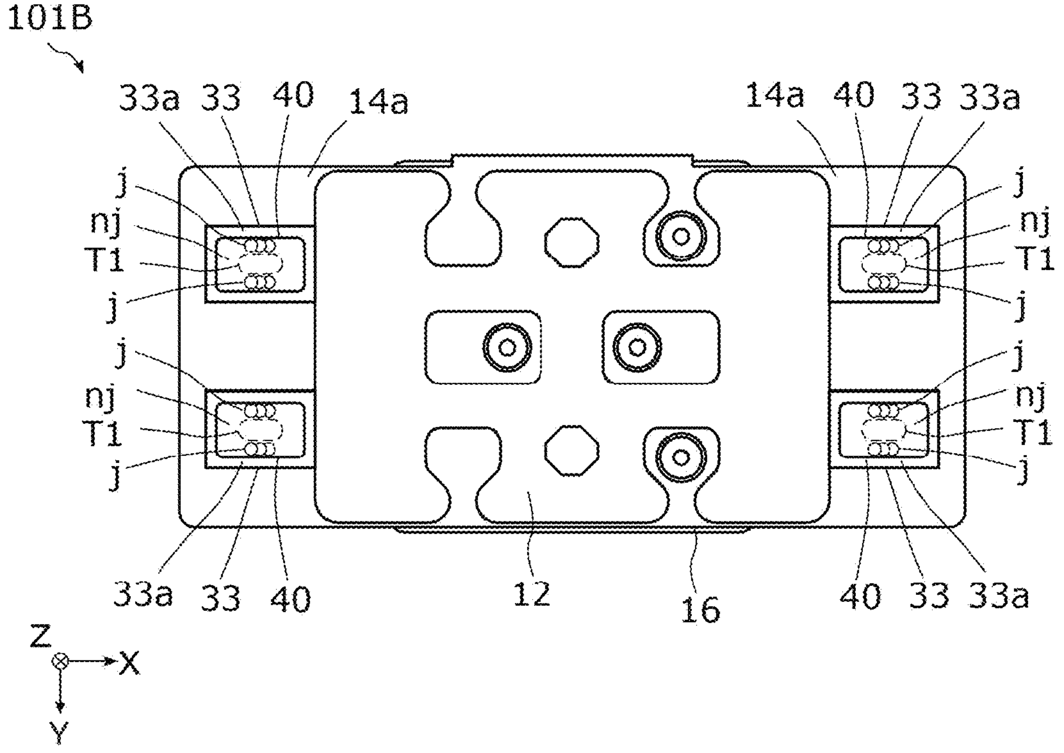
FIG. 32 is a bottom view of a switch according to Embodiment 4.
Figure 33:
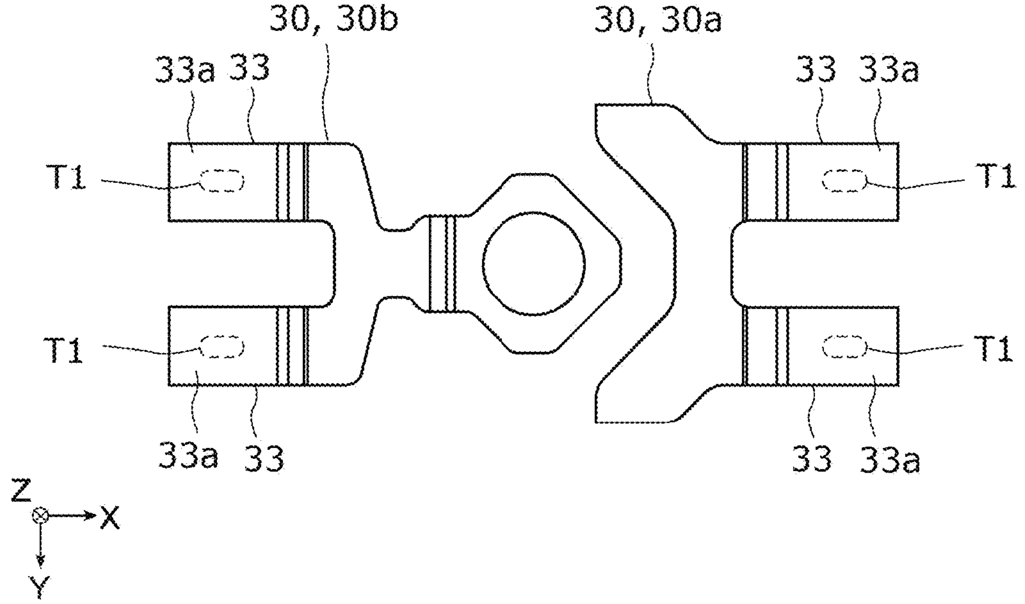
FIG. 33 is a bottom view of the fixed contact member of the switch according to Embodiment 4.

FIG. 32 is a bottom view of switch 1016 according to Embodiment 4. FIG. 33 is a bottom view of fixed contact members 30 of switch 1016.

Each terminal area 33 of switch 1016 according to Embodiment 4 includes tentative attachment region T1 that is contactable with solder member 40. Tentative attachment region T1 is located in a region different from regions that correspond to joint sites j, when viewed in a direction in which terminal area 33 and solder member 40 are arranged adjacent to each other, i.e., when viewed in the Z direction in FIG. 32. For example, when viewed in the Z direction, tentative attachment region T1 may be located in a region that corresponds to non-joint site nj. In the example shown in FIG. 32, tentative attachment region T1 is located in a region between a plurality of joint sites j.

Figure 34:
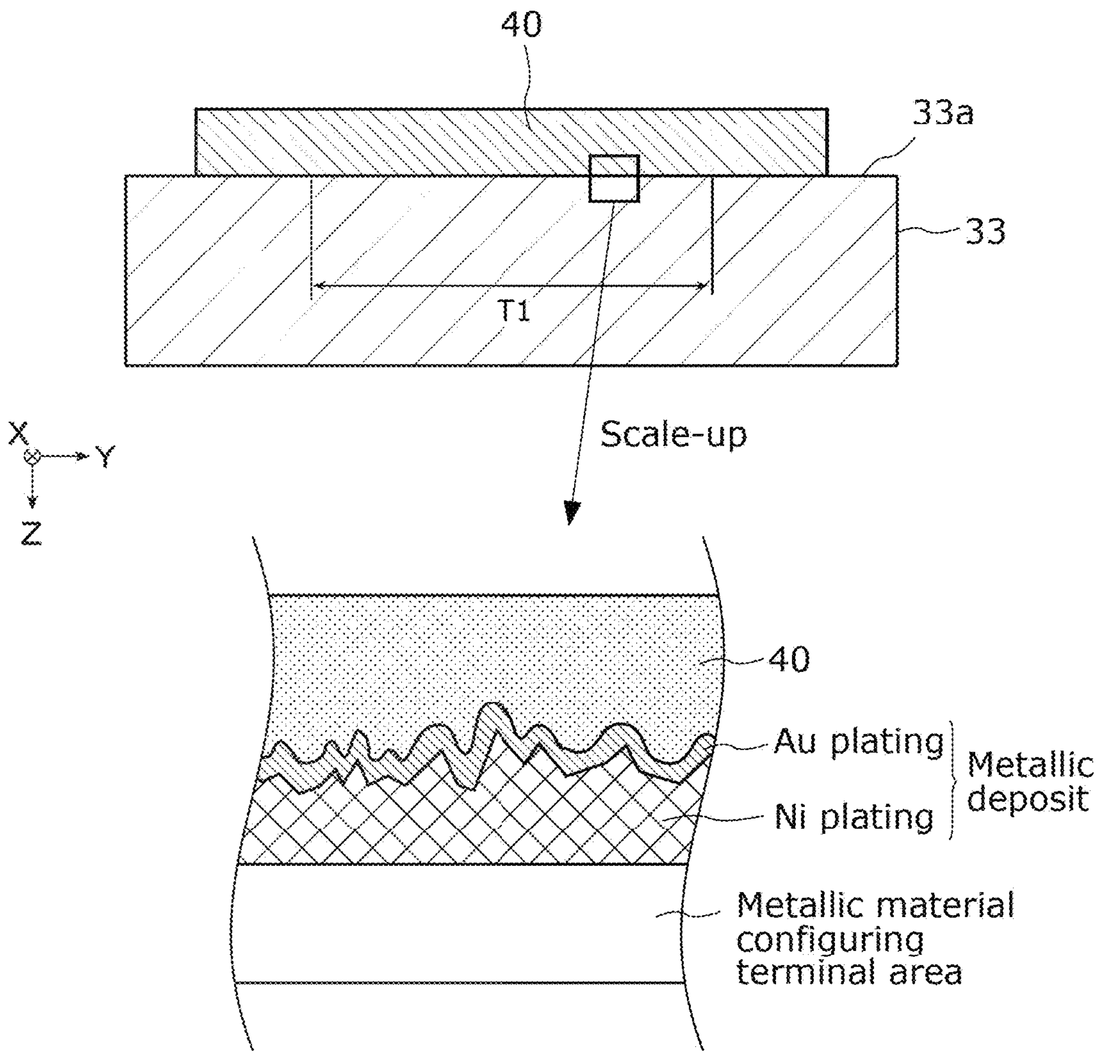
FIG. 34 is a sectional view of the terminal area and the solder member according to Embodiment 4.
Figure 35:
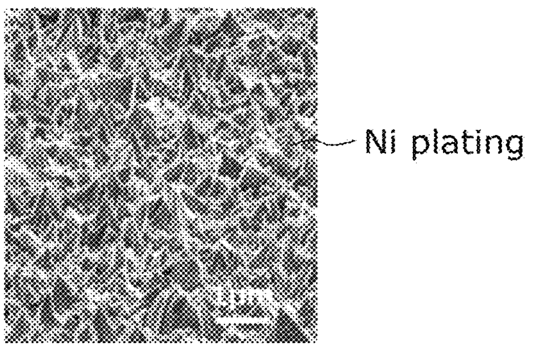
FIG. 35 represents an image of a metallic deposit on the terminal area according to Embodiment 4.

FIG. 34 is a sectional view of terminal area 33 and solder member 40 of switch 101B. FIG. 35 represents an image of a metallic deposit on terminal area 33. FIG. 35 represents a surface image of Ni plating.

As shown in FIGS. 33 and 34, tentative attachment region T1 is provided on the side of terminal bottom surface 33*a* of terminal area 33. Tentative attachment region T1 has asperities on the surface of terminal area 33.

A metallic deposit is formed on terminal bottom surface 33*a* of terminal area 33. The metallic deposit is configured by a plurality of metal plating films. In the present example, the metallic deposit is configured by Ni plating (see FIG. 35) formed on terminal bottom surface 33*a* and Au plating formed on the Ni plating. The metal plating formed on the Ni plating is not limited to Au plating, and may be Ag plating.

In tentative attachment region T1, terminal area 33 has surface roughness that is at least one of arithmetical mean roughness (Ra) or a maximum height (Rz), the arithmetical mean roughness being greater than or equal to 0.05 μm and less than or equal to 2 μm, the maximum height (Rz) being greater than or equal to 0.5 μm and less than or equal to 5 μm. The surface roughness may be obtained by, for example, a method in compliance with JIS B 0601-2001 by Japan Industrial Standards (JIS). The surface roughness of terminal area 33 is adjustable by changing the current density at the time of forming Ni plating by electroplating. For example, the value of the surface roughness may be increased by lowering the current density. The surface roughness of terminal area 33 may be set to fall within a predetermined range by, for example, irradiating terminal area 33 with laser or pressing a die with asperities against terminal area 33. Note that the surface roughness of terminal area 33 may be arithmetical mean roughness (Ra) of greater than or equal to 0.05 μm or a maximum height (Rz) of greater than or equal to 0.5 μm.

Terminal area 33 and solder member 40 are welded to each other under pressure in tentative attachment region T1. The metal material (stainless steel or phosphor bronze steel) and Ni plating of terminal area 33 each have higher hardness than solder member 40. Thus, when solder member 40 is welded to terminal area 33 under pressure, a region of terminal area 33 with surface asperities makes inroads into solder member 40, and terminal area 33 and solder member 40 are connected to each other by the anchor effect. The region of terminal area 33 with surface asperities may be the entire region of terminal area 33 or may be part of the entire region. Alternatively, terminal area 33 may include a plurality of regions with surface asperities.

As described thus far, in Embodiment 4, solder member 40 is tentatively attached to terminal area 33 before joined to terminal area 33. This reduces the likelihood that the position of solder member 40 placed on terminal area 33 may be displaced or solder member 40 may come off before or at the time of joining solder member 40 to terminal area 33.

Summary of Embodiments 2, 3, and 4

As described above, like switch 1 according to Embodiment 1, switches 101, 101A, and 1018 according to Embodiments 2, 3, and 4 each include case 10, movable contact member 20 disposed in case 10, fixed contact members 30 buried in part in case 10, and solder member 40 provided on fixed contact members 30. Each fixed contact member 30 includes contact portion 31 that is contactable with movable contact member 20, and terminal areas 33 electrically connected to contact portion 31 and exposed out of case 10. Solder member 40 includes joint sites j that are joined to terminal areas 33, and non-joint site nj that is not joined to terminal areas 33.

In switches 101, 101A, and 101B according to Embodiments 2, 3, and 4, each terminal area 33 includes tentative attachment region T1 that is contactable with solder member 40.

In this way, terminal areas 33 including tentative attachment region T1 reduces the likelihood that the position of solder member 40 placed on terminal areas 33 may be displaced or solder member 40 may come off before or at the time of joining solder member 40 to terminal area 33. Accordingly, it is possible to suppress a decrease in reliability of connection at the time of mounting.

Like switch 1 according to Embodiment 1, switch 101 according to Embodiment 2 includes case 10, movable contact member 20 disposed in case 10, fixed contact members 30 buried in part in case 10, and solder member 40 provided on fixed contact members 30. Each fixed contact member 30 includes contact portion 31 that is contactable with movable contact member 20, and terminal areas 33 electrically connected to contact portion 31 and exposed out of case 10. Solder member 40 includes joint sites j that are joined to terminal areas 33, and non-joint site nj that is not joined to terminal areas 33.

In switch 101 according to Embodiment 2, solder member 40 further includes tentative attachment region T1 that is contactable with terminal area 33.

In this way, solder member 40 including tentative attachment region T1 reduces the likelihood that the position of solder member 40 placed on terminal area 33 may be displaced or solder member 40 may come off before or at the time of joining solder member 40 to terminal area 33. Accordingly, it is possible to suppress a decrease in reliability of connection at the time of mounting.

Tentative attachment region T1 may further include binder 170.

Binder 170 in tentative attachment region T1 allows tentative attachment between terminal area 33 and solder member 40. This reduces the likelihood that the position of solder member 40 placed on terminal area 33 may be displaced or solder member 40 may come off before or at the time of joining solder member 40 to terminal area 33. Accordingly, it is possible to suppress a decrease in reliability of connection at the time of mounting.

Moreover, tentative attachment region T1 may include recessed portion 135, and binder 170 may be provided in recessed portion 135.

Binder 170 provided in recessed portion 135 allows binder 170 to be kept within tentative attachment region T1. This allows reliable tentative attachment between terminal area 33 and solder member 40 and reduces the likelihood that the position of solder member 40 placed on terminal area 33 may be displaced or solder member 40 may come off before or at the time of joining solder member 40 to terminal area 33. Accordingly, it is possible to suppress a decrease in reliability of connection at the time of mounting.

Recessed portion 135 may have bottom 135*a* and walls 135*b*, and corner portion 135*c* that connects bottom 135*a* and walls 135*b* may have an R-shaped curved surface.

This, for example, reduces the occurrence of biting or retention of air voids in corner portion 135*c* when binder 170 is provided in recessed portion 135. Accordingly, it is possible to avoid deformation or scattering of solder at the time of mounting and to suppress a decrease in reliability of connection at the time of mounting.

Recessed portion 135 may have a rectangular shape or an oval shape.

This reduces the likelihood that solder member 40 will be rotated relative to terminal area 33 when solder member 40 is tentatively attached to terminal area 33. Thus, reliable tentative attachment is achieved between terminal area 33 and solder member 40, and the likelihood is reduced that the position of solder member 40 placed on terminal area 33 will be displaced or solder member 40 will come off before or at the time of joining solder member 40 to terminal area 33.

Accordingly, it is possible to suppress a decrease in reliability of connection at the time of mounting.

Binder 170 may also be provided outside recessed portion 135.

Binder 170 provided also outside recessed portion 135 fills recessed portion 135 and allows reliable tentative attachment between terminal area 33 and solder member 40. This reduces the likelihood that the position of solder member 40 placed on terminal area 33 will be displaced or solder member 40 will come off before or at the time of joining solder member 40 to terminal area 33. Accordingly, it is possible to suppress a decrease in reliability of connection at the time of mounting.

Binder 170 may be a flux.

In this case, reliable tentative attachment is achieved between terminal area 33 and solder member 40. This reduces the likelihood that the position of solder member 40 placed on terminal area 33 will be displaced or solder member 40 will come off before or at the time of joining solder member 40 to terminal area 33. Accordingly, it is possible to suppress a decrease in reliability of connection at the time of mounting.

Solder member 40 may include a plurality of joint sites j, and when viewed in a direction in which terminal area 33 and solder member 40 are arranged adjacent to each other, tentative attachment region T1 may be located in a region between a plurality of joint sites j.

This allows the tentative attachment effect of tentative attachment region T1 to be poised and reduces the likelihood that the position of solder member 40 placed on terminal area 33 will be displaced or solder member 40 will come off before or at the time of joining solder member 40 to terminal area 33. Accordingly, it is possible to suppress a decrease in reliability of connection at the time of mounting.

Tentative attachment region T1 may include dent portion 136, and part of solder member 40 may be pressed into dent portion 136.

In this way, by pressing in part of solder member 40 in dent portion 136, it is possible to tentatively attach solder member 40 to terminal area 33 with reliability. This reduces the likelihood that the position of solder member 40 placed on terminal area 33 will be displaced or solder member 40 will come off before or at the time of joining solder member 40 to terminal area 33. Accordingly, it is possible to suppress a decrease in reliability of connection at the time of mounting.

Solder member 40 may include a plurality of joint sites j, and dent portion 136 may be located in a region between a plurality of joint sites j, when viewed in a direction in which terminal area 33 and solder member 40 are arranged adjacent to each other.

This allows the tentative attachment effect of tentative attachment region T1 to be poised and reduces the likelihood that the position of solder member 40 placed on terminal area 33 will be displaced or solder member 40 will come off before or at the time of joining solder member 40 to terminal area 33. Accordingly, it is possible to suppress a decrease in reliability of connection at the time of mounting.

Connection between terminal area 33 and solder member 40 in tentative attachment region T1 may be achieved by the anchor effect.

In this case, reliable tentative attachment is achieved between solder member 40 and terminal area 33. This reduces the likelihood that the position of solder member 40 placed on terminal area 33 will be displaced or solder member 40 will come off before or at the time of joining solder member 40 to terminal area 33. Accordingly, it is possible to suppress a decrease in reliability of connection at the time of mounting.

Terminal area 33 and solder member 40 may be welded to each other under pressure in tentative attachment region T1.

In this case, reliable tentative attachment is achieved between solder member 40 and terminal area 33. This reduces the likelihood that the position of solder member 40 placed on terminal area 33 will be displaced or solder member 40 will come off before or at the time of joining solder member 40 to terminal area 33. Accordingly, it is possible to suppress a decrease in reliability of connection at the time of mounting.

The surface roughness of terminal area 33 in tentative attachment region T1 may be represented by at least one of arithmetical mean roughness of greater than or equal to 0.05 μm and less than or equal to 2 μm or a maximum height of greater than or equal to 0.5 μm and less than or equal to 5 μm.

In this case, the anchor effect or the effect achieved by pressure welding is enhanced, and reliable tentative attachment is achieved between solder member 40 and terminal area 33. This reduces the likelihood that the position of solder member 40 placed on terminal area 33 will be displaced or solder member 40 will come off before or at the time of joining solder member 40 to terminal area 33. Accordingly, it is possible to suppress a decrease in reliability of connection at the time of mounting.

Tentative attachment region T1 of terminal area 33 may have a metallic deposit formed thereon.

In this case, the anchor effect or the effect achieved by pressure welding is enhanced, and reliable tentative attachment is achieved between solder member 40 and terminal area 33. This reduces the likelihood that the position of solder member 40 placed on terminal area 33 will be displaced or solder member 40 will come off before or at the time of joining solder member 40 to terminal area 33. Accordingly, it is possible to suppress a decrease in reliability of connection at the time of mounting.

Embodiment 5

Configurations of cable component 200 and cable-equipped connector 300 according to Embodiment 5 will be described. Cable component 200 and cable-equipped connector 300 according to the present embodiment are examples of the electronic component.

Cable-equipped connector 300 is configured by cable component 200 and connector 301.

Connector 301 is a connector that is mountable on a cable component 200 such as a flexible printed circuit (FPC) cable. Connector 301 is mounted on cable component 200 by electrically connecting plug terminals 333 to terminal areas 233 of cable component 200.

Figure 36A:
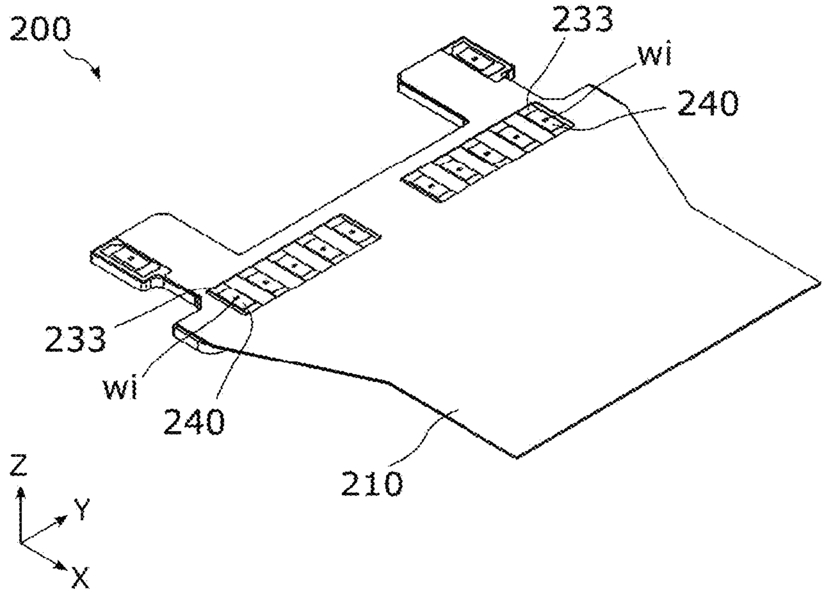
FIG. 36A is a perspective view of a cable component according to Embodiment 5.
Figure 36B:
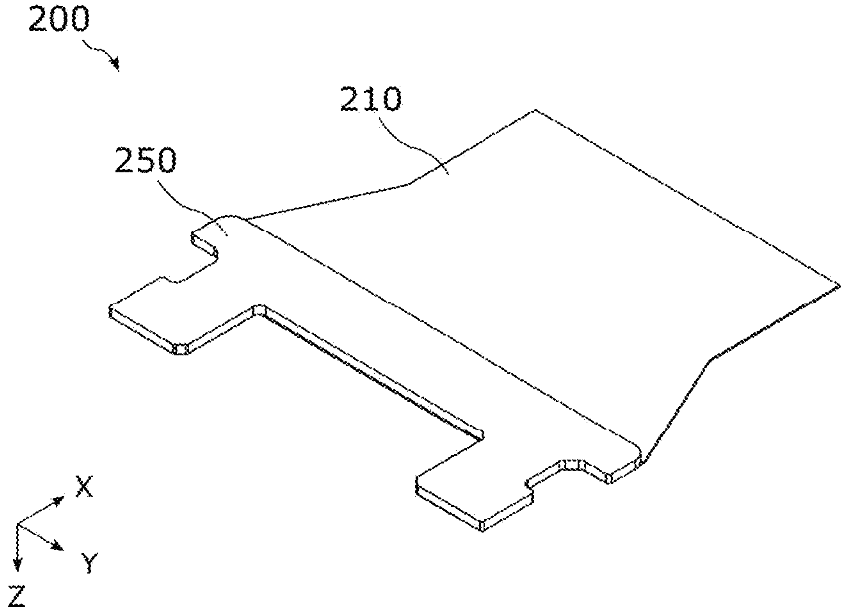
FIG. 36B is a perspective view of the cable component according to Embodiment 5.

FIGS. 36A and 36B are perspective views of cable component 200 according to Embodiment 5. FIGS. 37A, 37B, 37C, 37D, 37E, and 37F are a set of six drawings of cable component 200.

FIG. 36A is a perspective view showing a plane surface, a front surface, and a right side face of cable component 200, and FIG. 36B is a perspective view showing a bottom surface, a rear surface, and a left side face of cable component 200. FIGS. 37A, 37B, 37C, 37D, 37E, and 37F are a rear view, a left side view, a plan view, a right side view, a front view, and a bottom view, respectively.

Cable component 200 is a sheet component and has a front surface and a back surface. The front surface of cable component 200 is a mounting surface on which connector 301 is mounted. The back surface of cable component 200 is bonded to reinforcing plate 250 that includes a resin material or a metal material.

Cable component 200 includes base material 210 and terminal areas 233 formed on base material 210. Base material 210 has flexibility and includes an insulation material. Terminal areas 233 are wiring patterns formed by printing or any other means.

Cable component 200 according to the present embodiment further includes a plurality of solder members 240. The plurality of solder members 240 are fixedly attached to the plurality of terminal areas 233, respectively.

Figure 38A:
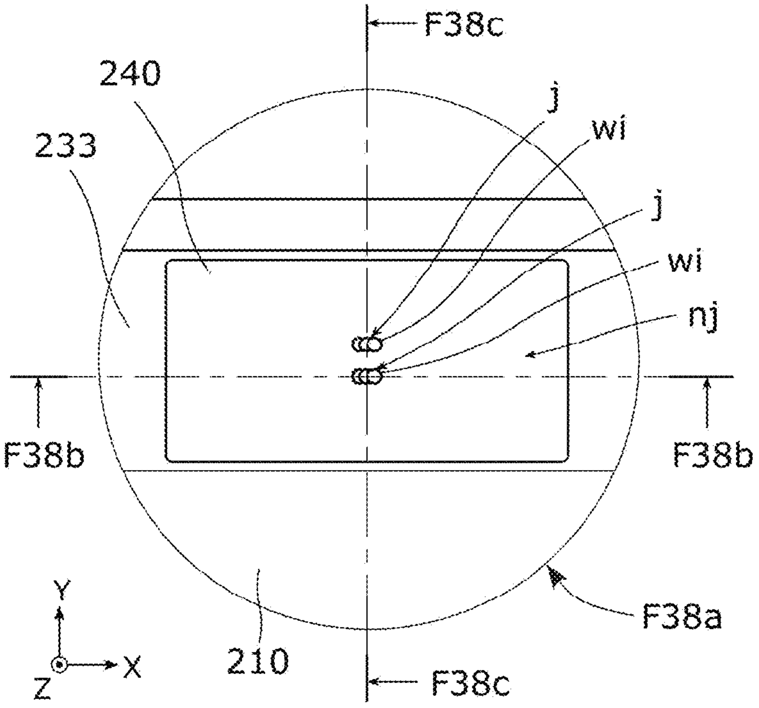
FIG. 38A is a partial enlarged view of the cable component according to Embodiment 5.
Figure 38B:
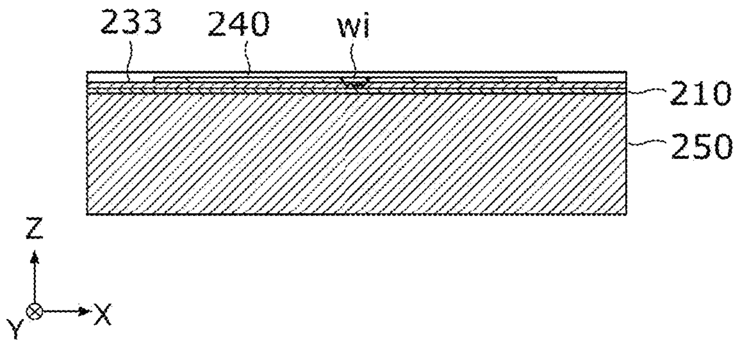
FIG. 38B is a partial enlarged view of the cable component according to Embodiment 5.
Figure 38C:
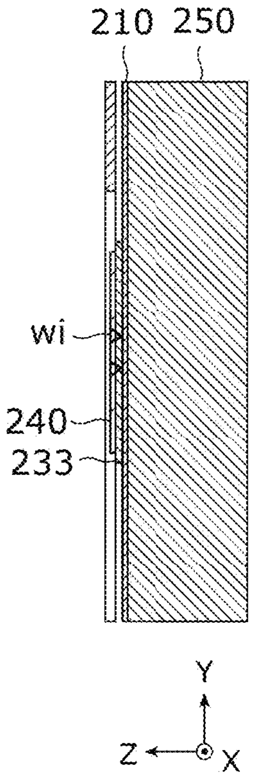
FIG. 38C is a partial enlarged view of the cable component according to Embodiment 5.

FIGS. 38A, 38B, and 38C are partial enlarged views of cable component 200.

Figure 37A:
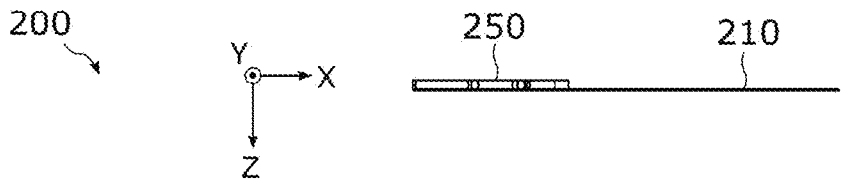
FIG. 37A is one of a set of six drawings of the cable component according to Embodiment 5.
Figure 37B:
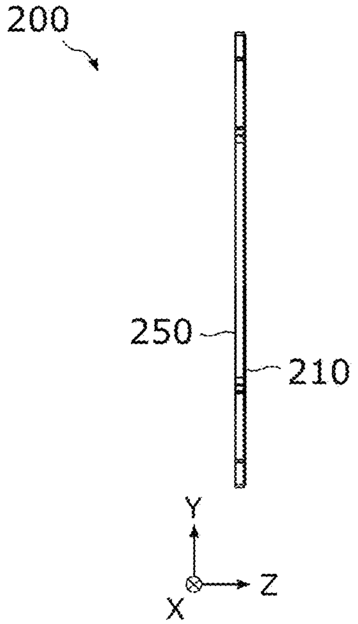
FIG. 37B is one of the set of six drawings of the cable component according to Embodiment 5.
Figure 37C:
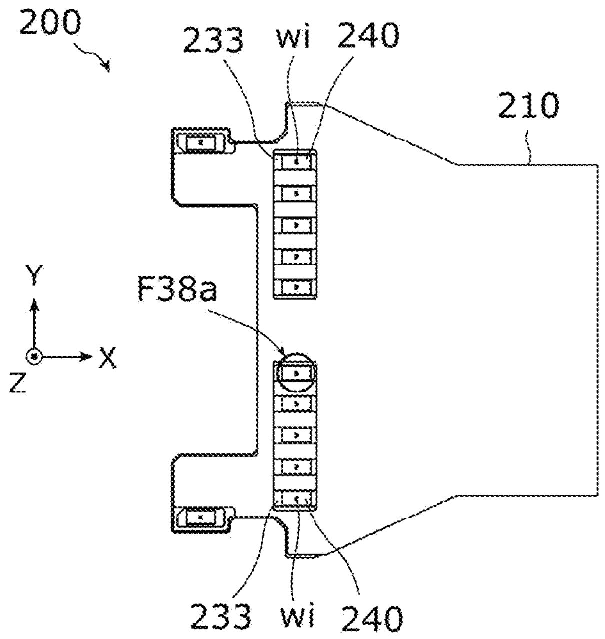
FIG. 37C is one of the set of six drawings of the cable component according to Embodiment 5.
Figure 37D:
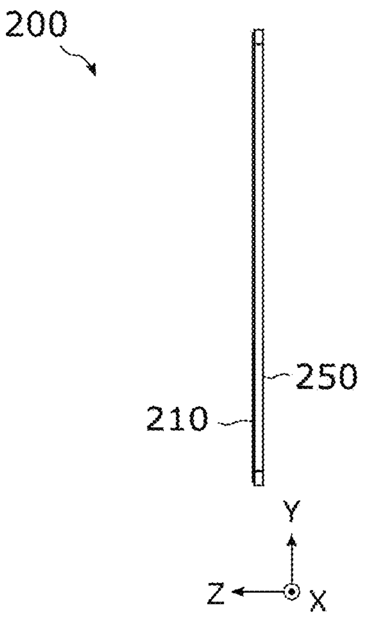
FIG. 37D is one of the set of six drawings of the cable component according to Embodiment 5.
Figure 37E:
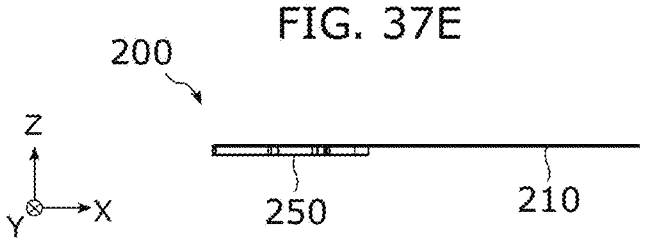
FIG. 37E is one of the set of six drawings of the cable component according to Embodiment 5.
Figure 37F:
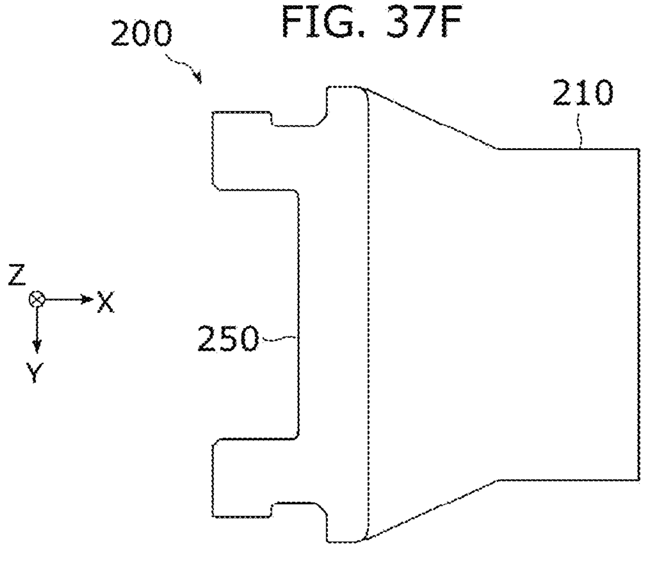
FIG. 37F is one of the set of six drawings of the cable component according to Embodiment 5.

FIG. 38A is an enlarged view of portion F38*a* shown in FIG. 37C. FIG. 38B is a sectional view taken along line F38*b*-F38*b* in FIG. 38A, and FIG. 38C is a sectional view taken along line F38*c*-F38*c* shown in FIG. 38A.

As shown in FIGS. 36A to 38C, solder members 240 are provided in one-to-one correspondence on terminal areas 233. Solder members 240 are smaller in area than terminal areas 233 and arranged so as not to extend outward of terminal areas 233 and to have side faces that are located inward of the side faces of terminal areas 233.

Solder members 240 are sheet members having a predetermined thickness. The thickness of solder members 240 is greater than the thickness of base material 210 and may, for example, be greater than or equal to 0.05 mm and less than or equal to 0.1 mm. When viewed from above, solder members 240 have a rectangular shape. Solder members 240 include materials such as Sn, Ag, and Cu. Note that solder members 240 may further include other materials added thereto.

As shown in FIGS. 38A to 38C, solder members 240 are joint in part to terminal areas 233 by soldering. That is, solder members 240 include joint sites j that are joined to terminal areas 233 and non-joint sites nj that are not joined to terminal areas 33. Joint sites j may be formed by, for example, laser machining.

These drawings show weld marks (joint marks) wi that are formed in regions irradiated with laser light. In this example, regions that include weld marks wi almost agree with joint sites j, and regions that include no weld marks wi almost agree with non-joint sites nj. Joint sites j shown in the drawings are continuously formed so that each of weld marks wi overlaps with one another. Note that joint sites j are not limited to being formed in one site, and may be formed in a plurality of sites as shown in FIG. 38A. In the drawings, the area of non-joint sites nj of solder member 240 is larger than the area of joint sites j. In other words, the area of joint sites j is smaller than the area of non-joint site nj.

In this way, in cable component 200 according to the present embodiment, solder member 240 includes joint sites j that are joined to terminal areas 233 and non-joint site nj that is not joined to terminal areas 233. This configuration eliminates the need to melt the solder material as a whole at the time of providing solder member 240 on terminal areas 233 and requires only part of the solder member to be molten. This makes it possible to suppress a change in the quality of the solder material as a whole. Accordingly, it is possible to suppress a decrease in reliability of connection at the time of mounting.

Next, cable-equipped connector 300 that includes cable component 200 and connector 301 will be described.

Figure 39A:
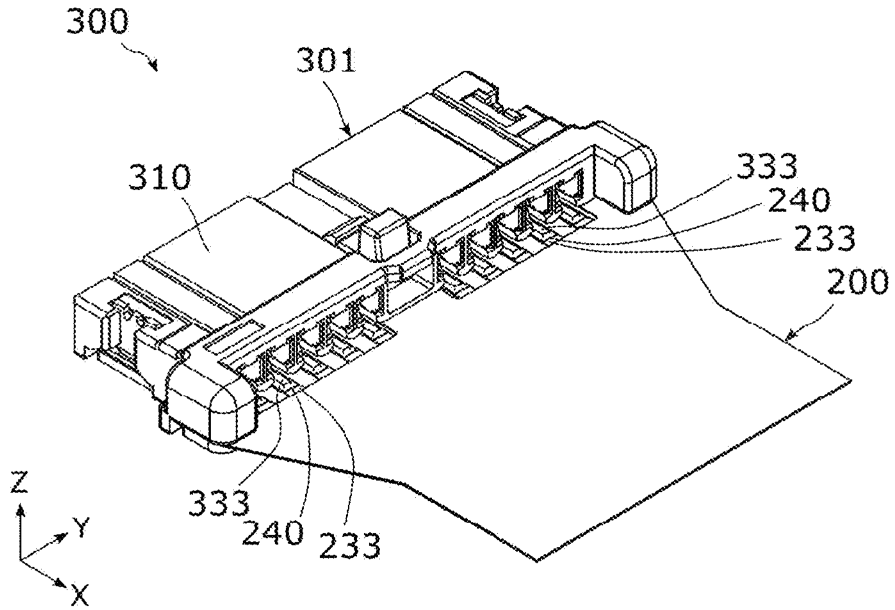
FIG. 39A is a perspective view of a cable-equipped connector according to Embodiment 5.
Figure 39B:
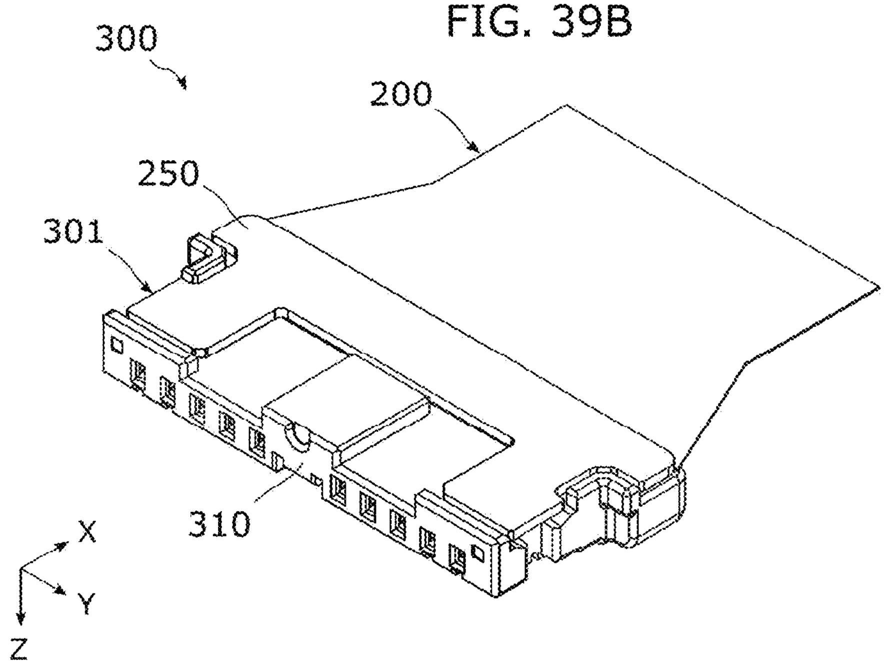
FIG. 39B is a perspective view of the cable-equipped connector according to Embodiment 5.
Figure 40:
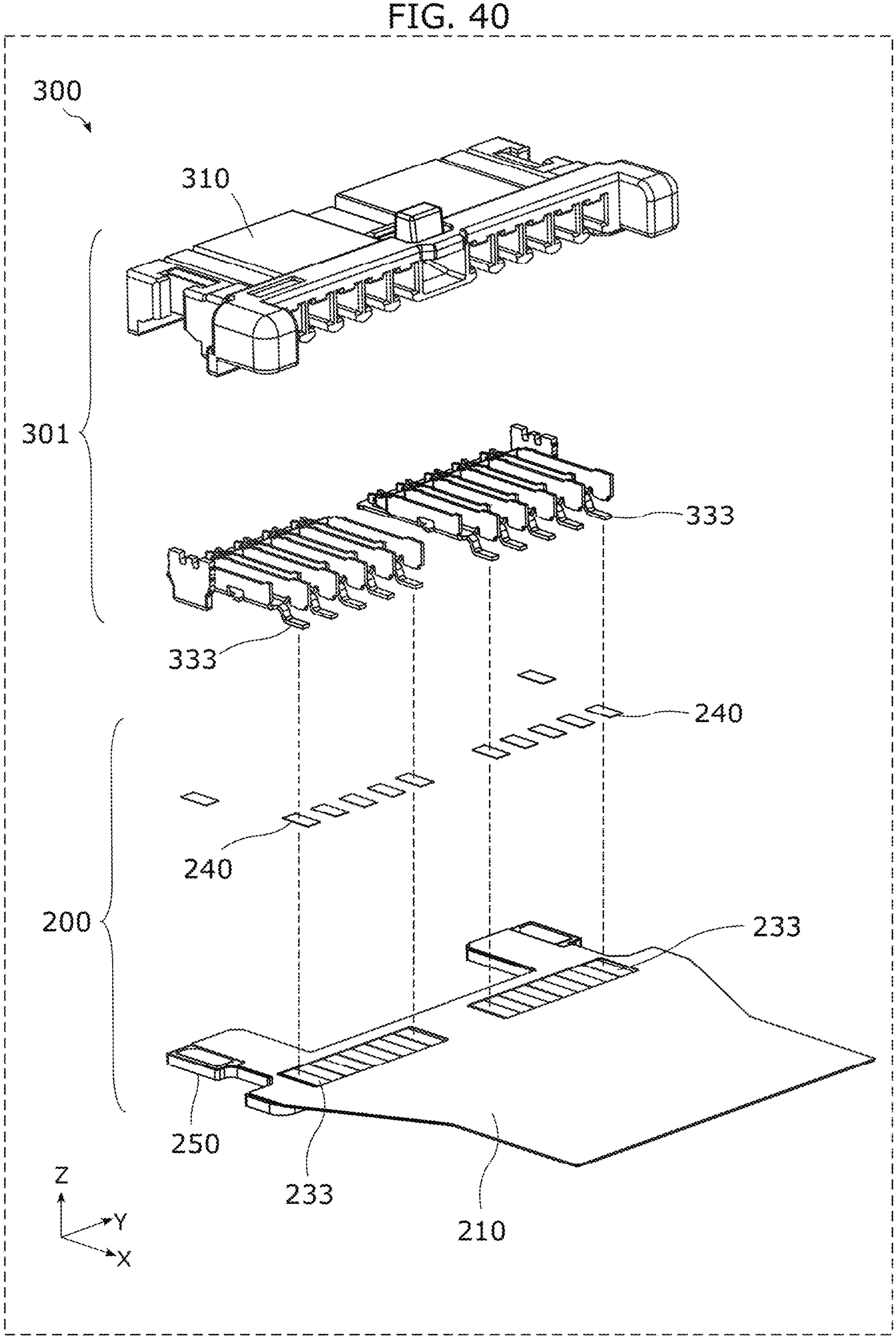
FIG. 40 is an exploded perspective view of the cable-equipped connector according to Embodiment 5.
Figure 41A:
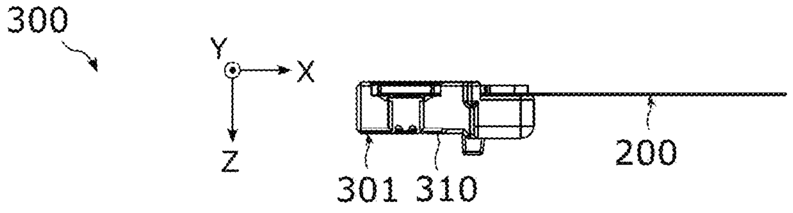
FIG. 41A is one of a set of six drawings of the cable-equipped connector according to Embodiment 5.
Figure 41B:
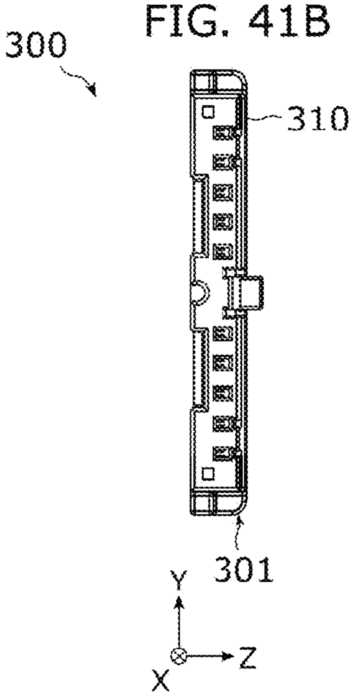
FIG. 41B is one of the set of six drawings of the cable-equipped connector according to Embodiment 5.
Figure 41C:
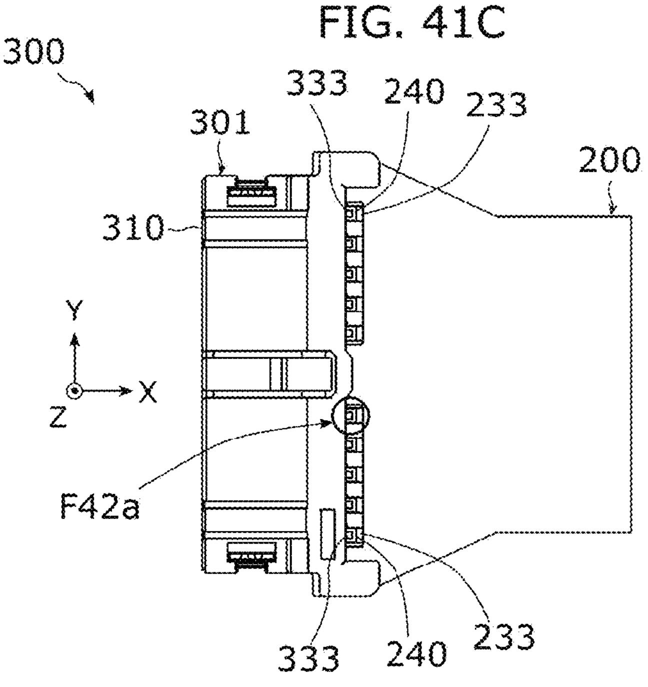
FIG. 41C is one of the set of six drawings of the cable-equipped connector according to Embodiment 5.
Figure 41D:
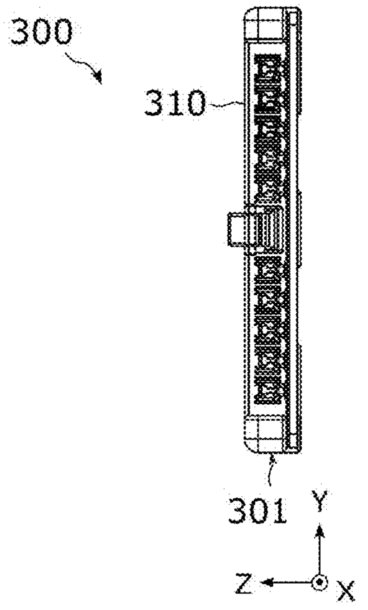
FIG. 41D is one of the set of six drawings of the cable-equipped connector according to Embodiment 5.
Figure 41E:
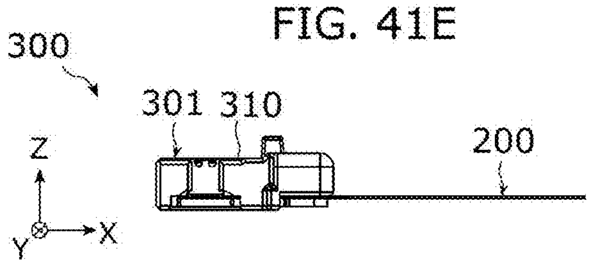
FIG. 41E is one of the set of six drawings of the cable-equipped connector according to Embodiment 5.
Figure 41F:
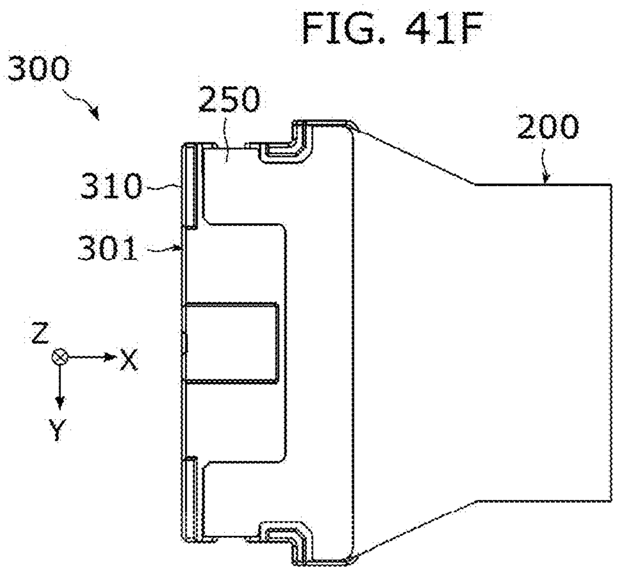
FIG. 41F is one of the set of six drawings of the cable-equipped connector according to Embodiment 5.
Figure 42A:
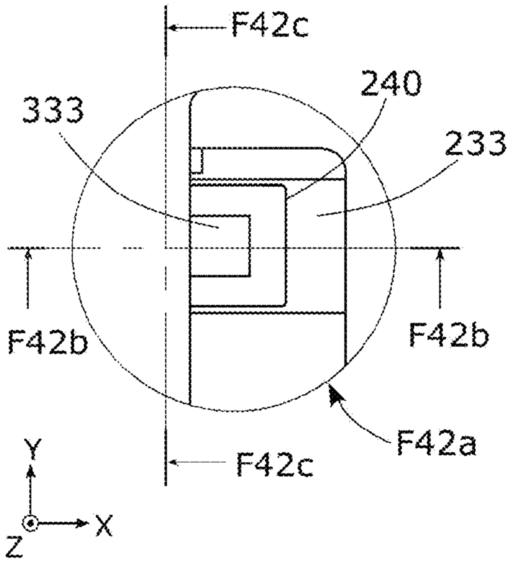
FIG. 42A is a partial enlarged view of the cable-equipped connector according to Embodiment 5.
Figure 42B:
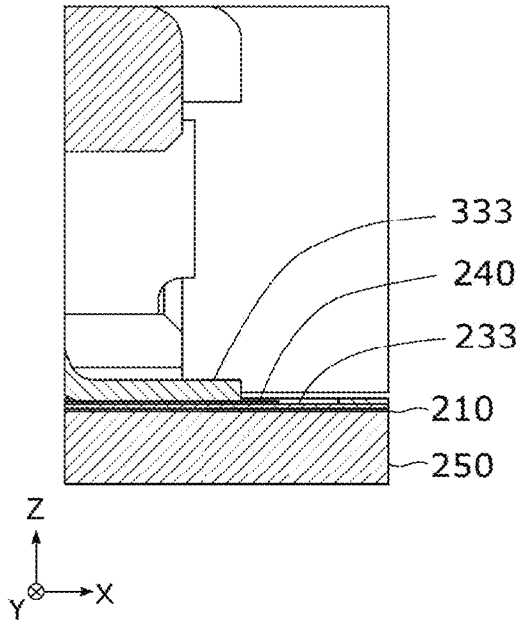
FIG. 42B is a partial enlarged view of the cable-equipped connector according to Embodiment 5.
Figure 42C:
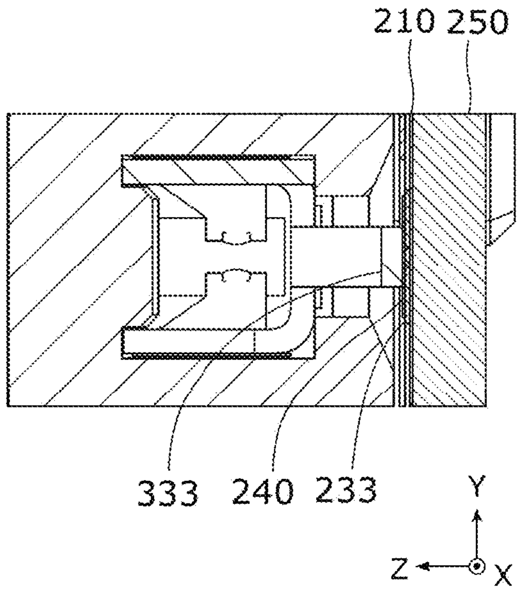
FIG. 42C is a partial enlarged view of the cable-equipped connector according to Embodiment 5.

FIGS. 39A and 39B are perspective views of cable-equipped connector 300 according to Embodiment 5. FIG. 40 is an exploded perspective view of cable-equipped connector 300. FIGS. 41A, 41B, 41C, 41D, 41E, and 41F are a set of six drawings of cable-equipped connector 300. FIGS. 42A, 42B, and 42C are partial enlarged views of cable-equipped connector 300.

FIG. 39A is a perspective view showing a plane surface, a front surface, and a right side face of cable-equipped connector 300, and FIG. 39B is a perspective view showing a bottom surface, a rear surface, and a left side face of cable-equipped connector 300. FIGS. 41A, 41B, 41C, 41D, 41E, and 41F are a rear view, a left side view, a plan view, a right side view, a front view, and a bottom view, respectively. FIG. 42A is an enlarged view of portion F42*a* shown in FIG. 41C. FIG. 42B is a sectional view taken along line F42*b*-F42*b* shown in FIG. 42A, and FIG. 42C is a sectional view taken along line F42*c*-F42*c* shown in FIG. 42A. To facilitate understanding, FIGS. 39A to 42C show solder member 240 that is not molten.

Connector 301 includes housing 310 and a plurality of plug terminals 333 held by housing 310.

Connector 301 is mounted on cable component 200 by connecting plug terminals 333 to terminal areas 233 of cable component 200 by soldering. Plug terminals 333 are connected in one-to-one correspondence to terminal areas 233. In the case of connecting plug terminals 333 to terminal areas 233, plug terminals 333 are first disposed on terminal areas 233 via solder member 240 and then solder member 240 is molten so as to connect plug terminals 333 and terminal areas 233. At this time, non-joint sites nj of solder member 240 are molten so as to firmly connect plug terminals 333 and terminal areas 233. Note that not only solder member 240 but also other solder materials may be added to establish connection by soldering.

By mounting connector 301 on cable component 200 in this way, cable-equipped connector 300 that includes cable component 200 and connector 301 is prepared.

Although each plug connector, out of a pair of connectors (connector set), is given as an example in the above description, the present disclosure is not limited to this example. For example, the connector may be a receptacle connector that is a connector of the party on the other side of the plug connector.

Overall Summary

The switch, the cable component, and the cable-equipped connector described above are examples of the electronic component. The electronic component according to the present disclosure has the following aspects.

(Aspect 1a)

Aspect 1a is an electronic component that includes a terminal area and a solder member provided on the terminal area. The solder member includes a joint site that is joined to the terminal area and a non-joint site that is not joined to the terminal area.

(Aspect 2a)

Aspect 2a is the electronic component described in Aspect 1a, in which the non-joint site has a larger area than the joint site.

(Aspect 3a)

Aspect 3a is the electronic component described in Aspect 1a, in which a gap is provided between the non-joint site and the terminal area.

(Aspect 4a)

Aspect 4a is the electronic component described in Aspect 1a, in which the joint site includes an alloy layer that comes in contact with the terminal area, and the alloy layer includes a metal material for the solder member and a metal material for the terminal area.

(Aspect 5a)

Aspect 5a is the electronic component described in Aspect 1a, in which the solder member has a first surface facing the terminal area and a second surface located on a side opposite to the first surface, the second surface includes a first region included in the joint site and a second region included in the non-joint site, and on the second surface, the second region is flatter than the first region.

(Aspect 6a)

Aspect 6a is the electronic component described in Aspect 1a, in which the solder member has a first surface facing the terminal area and a second surface located on a side opposite to the first surface, the second surface includes a first region included in the joint site and a second region included in the non-joint site, and on the second surface, the first region bulges outward of the second region in a direction opposite to the first surface.

(Aspect 7a)

Aspect 7a is the electronic component described in Aspect 5a, in which the solder member includes a plurality of joint sites, each of the plurality of joint sites being the joint site, and the second surface of the solder member includes a plurality of first regions, each other plurality of first regions being the first region.

(Aspect 8a)

Aspect 8a is the electronic component described in Aspect 7a, in which the solder member has a rectangular shape as viewed in a direction perpendicular to the second surface, and each of the plurality of first regions is provided along a short side of the solder member having the rectangular shape.

(Aspect 9a)

Aspect 9a is the electronic component described in Aspect 5a that further includes a case that includes a top panel, a bottom surface, and a dent bottom surface located on a side closer to the top panel than the bottom surface. The terminal area is exposed out of the case while being in contact with the dent bottom surface, and the terminal area has a bottom surface that is a terminal bottom surface located on a side closer to the top panel than the bottom surface.

(Aspect 10a)

Aspect 10a is the electronic component described in Aspect 9a, in which the solder member is arranged so that the first surface is located on a side closer to the top panel of the case than the bottom surface of the case and the second surface is located to protrude out of the bottom surface of the case.

(Aspect 11a)

Aspect 11a is the electronic component described in Aspect 1a, in which the terminal area includes a tentative attachment region that is contactable with the solder member.

(Aspect 12a)

Aspect 12a is the electronic component described in Aspect 1a, in which the solder member includes a tentative attachment region that is contactable with the terminal area.

(Aspect 13a)

Aspect 13a is the electronic component described in Aspect 11a, in which the tentative attachment region is provided with a binder.

(Aspect 14a)

Aspect 14a is the electronic component described in Aspect 13a, in which the tentative attachment region includes a recessed portion, and the binder is provided in the recessed portion.

(Aspect 15a)

Aspect 15a is the electronic component described in Aspect 14a, in which the recessed portion has a bottom and a wall, and a corner portion that connects the bottom and the wall has an R-shaped curved surface.

(Aspect 16a)

Aspect 16a is the electronic component described in Aspect 14a, in which the recessed portion has a rectangular shape or an oval shape.

(Aspect 17a)

Aspect 17a is the electronic component described in Aspect 14a, in which the binder is also provided outside the recessed portion.

(Aspect 18a)

Aspect 18a is the electronic component described in Aspect 13a, in which the binder is a flux (Aspect 19a)

Aspect 19a is the electronic component described in Aspect 11a, in which the solder member includes a plurality of joint sites, each of the plurality of joint sites being the joint site, and the tentative attachment region is located in a region between the plurality of joint sites when viewed in a direction in which the terminal area and the solder member are arranged adjacent to each other.

(Aspect 20a)

Aspect 20a is the electronic component described in Aspect 11a, in which the tentative attachment region include a dent portion, and part of the solder member is pressed in the dent portion.

(Aspect 21a)

Aspect 21a is the electronic component described in Aspect 20a, in which the solder member includes a plurality of joint sites, each of the plurality of joint sites being the joint site, and the dent portion is located in a region between the plurality of joint sites when viewed in a direction in which the terminal area and the solder member are arranged adjacent to each other.

(Aspect 22a)

Aspect 22a is the electronic component described in Aspect 11a, in which the terminal area and the solder member are connected to each other in the tentative attachment region by an anchor effect.

(Aspect 23a)

Aspect 23 is the electronic component described in Aspect 11a, in which the terminal area and the solder member are welded to each other under pressure in the tentative attachment region.

(Aspect 24a)

Aspect 24a is the electronic component described in Aspect 22a, in which, in the tentative attachment region, the terminal area has surface roughness that is at least one of arithmetic mean roughness greater than or equal to 0.05 μm and less than or equal to 2 μm or a maximum height greater than or equal to 0.5 μm and less than or equal to 5 μm.

(Aspect 25a)

Aspect 25a is the electronic component described in Aspect 22a, in which the tentative attachment region of the terminal area has a metallic deposit formed thereon.

Other Embodiments

While the switch, the cable component, and the cable-equipped connector according to the embodiments and variations of the present disclosure have been described thus far, the present disclosure is not limited to these embodiments and variations.

Although in Embodiments 1 to 4 described above, terminal area 33 protrudes laterally from dent side face 14*b* and is exposed out of case 10 while being in contact with dent bottom surface 14*a*, the present disclosure is not limited to this example. For example, terminal area 33 may protrude from dent bottom surface 14*a* and may be exposed out of case 10.

Switch 1 according to the above-described embodiments may be manufactured by the following method. For example, the method of manufacturing the switch may include a step of brining terminal area 33 into abutment with solder member 40, and a step of securing solder member 40 to terminal area 33 by thermally melting a partial region of solder member 40.

Although the above-described embodiments describe switch 1 in which solder member 40 is secured to terminal area 33, switch 1 may be mounted on a circuit board by the following method. For example, in the case where the circuit board is a flexible printed circuit board, switch 1 may be mounted on the circuit board by pressing a thermal tool such as a soldering iron from the back surface of the circuit board to melt solder member 40 while switch 1 is arranged on the surface of the circuit board.

The present disclosure is not limited to switch 1, and may be applied to, for example, an electronic component that is mounted on a circuit board or the like by using a solder material. The electronic component may include, for example, an electronic component body that includes a functional element such as an active element or a passive element, an external terminal that is electrically connected to the functional element and drawn to the outside from the electronic component main body, and a solder member provided on the external terminal. The solder member may include a joint site that is joined to the external terminal, and a non-joint site that is not joined to the external terminal.

The present disclosure is not limited to the embodiments described above. Those skilled in the art will readily appreciate that various modifications may be made in the exemplary embodiment, and other embodiments may be made by arbitrarily combining some of the structural elements of different exemplary embodiments without materially departing from the principles and spirit of the inventive concept.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The switch according to the present disclosure is useful as a switch used in operation parts of a variety of electronic equipment. The cable component and the cable-equipped connector according to the present disclosure are useful as a cable component and a cable-equipped connector for connecting a variety of electronic equipment to wiring.

The invention claimed is:

1. An electronic component comprising:

a terminal area; and a solder member provided on the terminal area, wherein the solder member includes a joint site that is joined to the terminal area, and a non-joint site that is not joined to the terminal area, the solder member has a first surface that faces the terminal area and a second surface that is located on a side opposite to the first surface, the joint site joined to the terminal area is disposed in the first surface, and the non-joint site not joined to the terminal area is disposed in the first surface.

2. The electronic component according to claim 1, wherein the non-joint site has a larger area than the joint site.

3. The electronic component according to claim 1, wherein a gap is provided between the non-joint site and the terminal area.

4. The electronic component according to claim 1, wherein the joint site includes an alloy layer that comes in contact with the terminal area, and the alloy layer includes a metal material for the solder member and a metal material for the terminal area.

5. The electronic component according to claim 1, wherein the terminal area includes a tentative attachment region that is contactable with the solder member.

6. The electronic component according to claim 5, wherein the tentative attachment region is provided with a binder.

7. The electronic component according to claim 6, wherein the tentative attachment region includes a recessed portion, and the binder is provided in the recessed portion.

8. The electronic component according to claim 7, wherein the recessed portion has a bottom and a wall, and a corner portion that connects the bottom and the wall has an R-shaped curved surface.

9. The electronic component according to claim 7, wherein the recessed portion has a rectangular shape or an oval shape.

10. The electronic component according to claim 7, wherein the binder is also provided outside the recessed portion.

11. The electronic component according to claim 6, wherein the binder is a flux.

12. The electronic component according to claim 5, wherein the solder member includes a plurality of joint sites, each of the plurality of joint sites being the joint site, and the tentative attachment region is located in a region between the plurality of joint sites when viewed in a direction in which the terminal area and the solder member are arranged adjacent to each other.

13. The electronic component according to claim 5, wherein the tentative attachment region includes a dent portion, and part of the solder member is pressed in the dent portion.

14. The electronic component according to claim 13, wherein the solder member includes a plurality of joint sites, each of the plurality of joint sites being the joint site, and the dent portion is located in a region between the plurality of joint sites when viewed in a direction in which the terminal area and the solder member are arranged adjacent to each other.

15. The electronic component according to claim 5, wherein the terminal area and the solder member are connected to each other in the tentative attachment region by an anchor effect.

16. The electronic component according to claim 15, wherein, in the tentative attachment region, the terminal area has surface roughness that is at least one of arithmetical mean roughness greater than or equal to 0.05 μm and less than or equal to 2 μm or a maximum height greater than or equal to 0.5 μm and less than or equal to 5 μm.

17. The electronic component according to claim 15, wherein the tentative attachment region of the terminal area has a metallic deposit formed thereon.

18. The electronic component according to claim 5, wherein the terminal area and the solder member are welded to each other under pressure in the tentative attachment region.

19. The electronic component according to claim 1, wherein the solder member includes a tentative attachment region that is contactable with the terminal area.

20. An electronic component comprising:

a terminal area; and a solder member provided on the terminal area, wherein the solder member includes a joint site that is joined to the terminal area, and a non-joint site that is not joined to the terminal area, the solder member has a first surface facing the terminal area and a second surface located on a side opposite to the first surface, the second surface includes a first region included in the joint site and a second region included in the non-joint site, and on the second surface, the second region is flatter than the first region.

21. The electronic component according to claim 20, wherein the solder member includes a plurality of joint sites, each of the plurality of joint sites being the joint site, and the second surface of the solder member includes a plurality of first regions, each of the plurality of first regions being the first region.

22. The electronic component according to claim 21, wherein the solder member has a rectangular shape as viewed in a direction perpendicular to the second surface, and each of the plurality of first regions is provided along a short side of the solder member having the rectangular shape.

23. The electronic component according to claim 20, further comprising:

a case including a top panel, a bottom surface, and a dent bottom surface located on a side closer to the top panel than the bottom surface, wherein the terminal area is exposed out of the case while being in contact with the dent bottom surface, and the terminal area has a bottom surface that is a terminal bottom surface located on a side closer to the top panel than the bottom surface.

24. The electronic component according to claim 23, wherein the solder member is arranged so that the first surface is located on a side closer to the top panel of the case than the bottom surface of the case and the second surface is located to protrude out of the bottom surface of the case.

25. An electronic component comprising:

a terminal area; and a solder member provided on the terminal area, wherein the solder member includes a joint site that is joined to the terminal area, and a non-joint site that is not joined to the terminal area, the solder member has a first surface facing the terminal area and a second surface located on a side opposite to the first surface, the second surface includes a first region included in the joint site and a second region included in the non-joint site, and on the second surface, the first region bulges outward of the second region in a direction opposite to the first surface.

* * * * *